(12) United States Patent
Turner et al.

(10) Patent No.: US 8,947,422 B2
(45) Date of Patent: Feb. 3, 2015

(54) GRADIENT MODELING TOOLKIT FOR SCULPTING STEREOSCOPIC DEPTH MODELS FOR CONVERTING 2-D IMAGES INTO STEREOSCOPIC 3-D IMAGES

(75) Inventors: Tara Handy Turner, Marina Del Rey, CA (US); Evan M. Goldberg, Los Angeles, CA (US); Matthew F. Schnittker, Castaic, CA (US); Joseph W. Longson, Castaic, CA (US); Robert M. Neuman, Santa Clarita, CA (US)

(73) Assignee: Disney Enterprises, Inc., Burbank, CA (US)

( * ) Notice: Subject to any disclaimer, the term of this patent is extended or adjusted under 35 U.S.C. 154(b) by 285 days.

(21) Appl. No.: 12/571,412

(22) Filed: Sep. 30, 2009

(65) Prior Publication Data

US 2011/0074784 A1    Mar. 31, 2011

(51) Int. Cl.
*H04N 15/00*     (2006.01)
*G06T 15/00*     (2011.01)
*G06K 9/00*      (2006.01)
*H04N 13/02*     (2006.01)
(Continued)

(52) U.S. Cl.
CPC .............. *H04N 13/026* (2013.01); *G06T 13/20* (2013.01); *G06T 19/00* (2013.01); *H04N 13/0022* (2013.01); *H04N 13/0275* (2013.01)
USPC ........... 345/419; 345/427; 345/629; 345/672; 345/619; 382/154; 382/162; 382/164; 348/44; 348/46; 348/51; 715/781

(58) Field of Classification Search
CPC ............ H04N 13/026; H04N 13/0275; H04N 13/0022; G06T 13/20; G06T 19/00
USPC ........ 345/629, 419, 427; 382/154; 348/44–51
See application file for complete search history.

(56) References Cited

U.S. PATENT DOCUMENTS 4,925,294 A    5/1990    Geshwind et al.
5,499,323 A    3/1996    Doi et al.
(Continued)

FOREIGN PATENT DOCUMENTS

WO    2004/021151    3/2004
WO    2008/060289    5/2008

OTHER PUBLICATIONS

Johnston, Scott F., "Non-Photorealistic Animation and Rendering," Proceedings of the 2nd International Symposium on Non-Photorealistic Animation and Rendering, Annecy, France, pp. 45-ff, 2002.

(Continued)

*Primary Examiner* — Jin-Cheng Wang
(74) *Attorney, Agent, or Firm* — Dorsey & Whitney LLP

(57) ABSTRACT

Implementations of the present invention involve methods and systems for creating depth and volume in a 2-D planar image to create an associated 3-D image by utilizing a plurality of layers of the 2-D image, where each layer comprises one or more portions of the 2-D image. Each layer may be reproduced into a corresponding left eye and right eye layers, with one or both layers including a pixel offset corresponding to a perceived depth. Further, a depth model may be created for one or more objects of the 2-D image to provide a template upon which the pixel offset for one or more pixels of the 2-D image may be adjusted to provide the 2-D image with a more nuanced 3-D effect. In this manner, the 2-D image may be converted to a corresponding 3-D image with a perceived depth.

22 Claims, 15 Drawing Sheets

(51) Int. Cl.
*H04N 13/00* (2006.01)
*G06T 13/20* (2011.01)
*G06T 19/00* (2011.01)

(56) References Cited

U.S. PATENT DOCUMENTS

| | | | |
|---|---|---|---|
| 5,510,832 | A | 4/1996 | Garcia |
| 6,208,348 | B1 | 3/2001 | Kaye |
| 6,515,659 | B1 | 2/2003 | Kaye |
| 6,590,573 | B1 | 7/2003 | Geshwind |
| 6,664,961 | B2 | 12/2003 | Ray et al. |
| 6,686,926 | B1 | 2/2004 | Kaye |
| 7,082,223 | B1 | 7/2006 | Harris |
| 7,102,633 | B2 | 9/2006 | Kaye |
| 7,116,323 | B2 | 10/2006 | Kaye |
| 7,116,324 | B2 | 10/2006 | Kaye |
| 7,254,265 | B2 | 8/2007 | Naske et al. |
| 7,256,779 | B2 * | 8/2007 | Donnelly ............ 345/421 |
| 7,573,475 | B2 | 8/2009 | Sullivan et al. |
| 7,639,838 | B2 | 12/2009 | Nims |
| 7,925,078 | B2 | 4/2011 | Rhodes |
| 8,351,689 | B2 | 1/2013 | Turner et al. |
| 8,502,862 | B2 | 8/2013 | Turner et al. |
| 2002/0118275 | A1 | 8/2002 | Harman |
| 2002/0186216 | A1 * | 12/2002 | Baumberg et al. ....... 345/422 |
| 2003/0007681 | A1 | 1/2003 | Baker |
| 2004/0222988 | A1 * | 11/2004 | Donnelly ............ 345/419 |
| 2005/0254702 | A1 | 11/2005 | Era |
| 2006/0184279 | A1 * | 8/2006 | Okamoto et al. ....... 700/245 |
| 2007/0279415 | A1 | 12/2007 | Sullivan et al. |
| 2008/0247670 | A1 * | 10/2008 | Tam et al. ............ 382/298 |
| 2009/0195643 | A1 | 8/2009 | Neuman |
| 2009/0196492 | A1 * | 8/2009 | Jung et al. ............ 382/154 |
| 2009/0219283 | A1 | 9/2009 | Hendrickson et al. |
| 2009/0219383 | A1 * | 9/2009 | Passmore .............. 348/44 |
| 2009/0322860 | A1 | 12/2009 | Zhang et al. |
| 2010/0073364 | A1 * | 3/2010 | Jung et al. ............ 345/419 |
| 2010/0080448 | A1 * | 4/2010 | Tam et al. ............ 382/154 |
| 2010/0265248 | A1 * | 10/2010 | McCrae et al. ........ 345/419 |
| 2011/0050687 | A1 | 3/2011 | Alyshev et al. |
| 2011/0050864 | A1 * | 3/2011 | Bond ................ 348/51 |
| 2011/0074778 | A1 | 3/2011 | Turner et al. |
| 2011/0074784 | A1 | 3/2011 | Turner et al. |
| 2011/0210969 | A1 * | 9/2011 | Barenbrug ............ 345/419 |
| 2011/0304691 | A1 | 12/2011 | Newton et al. |
| 2012/0099836 | A1 | 4/2012 | Welsh et al. |

OTHER PUBLICATIONS

Petrovic et al., "Shadows for Cel Animation," Proceedings of SIG-GRAPH2000, pp. 511-516, 2000.

US Non-Final Office Action dated Apr. 4, 2012, U.S. Appl. No. 12/571,418, filed Sep. 30, 2009, 8 pages.

Battiato, et al., "3D stereoscopic image pairs by depth-map generation", Proceedings of the 2nd International Symposium on 3D Data Processing, Visualization, and Transmission (3DPVT'04), IEEE, 2004, 8 pages.

Brimelow, "New tutorial on parallax 3D effects", http://www.leebrimelow.com/new-tutorial-on-parallax-3d-effects/. Published on Dec. 5, 2008.

EP Search Report, "EP 10179710.8; Method and System for Creating Depth and Volume in a 2-D Planar Image", 7 pages, Apr. 26, 2013.

Tam, et al., "3D-TV Content Generation: 2D-to-3D Conversion", 2006 IEEE International Conference on Multimedia and Expo (Jul. 12, 2006), 1869-1872.

* cited by examiner

GRADIENT MODELING TOOLKIT FOR SCULPTING STEREOSCOPIC DEPTH MODELS FOR CONVERTING 2-D IMAGES INTO STEREOSCOPIC 3-D IMAGES

FIELD OF THE INVENTION

Aspects of the present invention relate to conversion of two dimensional (2-D) multimedia content to stereoscopic three dimensional (3-D) multimedia content. More particularly, aspects of the present invention involve a gradient modeling toolkit for sculpting stereoscopic gradient models for a 2-D image for purposes of applying a stereoscopic 3-D effect to one or objects of the 2-D image.

BACKGROUND

Three dimensional (3-D) imaging, or stereoscopy, is a technique used to create the illusion of depth in an image. In many cases, the stereoscopic effect of an image is created by providing a slightly different perspective of a particular image to each eye of a viewer. The slightly different left eye image and right eye image may present two perspectives of the same object, where the perspectives differ from each other in a manner similar to the perspectives that the viewer's eyes may naturally experience when directly viewing a three dimensional scene. For example, in a frame of a stereoscopic 3-D film or video, a corresponding left eye frame intended for the viewer's left eye may be filmed from a slightly different angle (representing a first perspective of the object) from the corresponding right eye frame intended for the viewer's right eye (representing a second perspective of the object). When the two frames are viewed simultaneously or nearly simultaneously, the pixel offset between the left eye frame and the right eye frame provides a perceived depth to the objects in the frames, thereby presenting the combined frames in what appears as three dimensions.

In creating stereoscopic 3-D animation from 2-D animation, one approach to construct the left eye and right eye images necessary for a stereoscopic 3-D effect is to first create a virtual 3-D environment consisting of a computer-based virtual model of the 2-D image, which may or may not include unique virtual models of specific objects in the image. These objects are positioned and animated in the virtual 3-D environment to match the position of the object(s) in the 2-D image when viewed through a virtual camera. For stereoscopic rendering, two virtual cameras are positioned with an offset between them (inter-axial) to simulate the left eye and right eye views of the viewer. Once positioned, the color information from each object in the original image is "cut out" (if necessary) and projected from a virtual projecting camera onto the virtual model of that object. This process is commonly referred to as projection mapping. The color information, when projected in this manner, presents itself along the front (camera facing) side of the object and also wraps around some portion of the front sides of the object. Specifically, any pixel position where the virtual model is visible to the projection camera will display a color that matches the color of the projected 2-D image at that pixel location. Depending on the algorithm used, there may be some stretching or streaking of the pixel color as a virtual model bends toward or away from the camera at extreme angles from perpendicular, but this is generally not perceived by a virtual camera positioned with sufficiently small offset to either side of the projecting camera.

Using this projection-mapped model in the virtual 3-D environment, the left eye and right eye virtual cameras will capture different perspectives of particular objects (representing the left eye and the right eye views) that can be rendered to generate left eye and right eye images for stereoscopic viewing. However, this technique to convert a 2-D image to a stereoscopic 3-D image has several drawbacks. First, creating a virtual 3-D environment with virtual models and cameras is a labor-intensive task requiring computer graphics software and artistic and/or technical talent specialized in the field of 3-D computer graphics. Second, with animated objects, the virtual model must alter over time (frame by frame) to match the movement and deformation of the object in the 2-D image. For the best results, the alteration of the model precisely matches the movement of the object(s) frame by frame. Camera movement may also be taken into account. This is a time consuming task requiring advanced tracking and significant manual labor. In addition, this requires that the 2-D image be recreated almost entirely in a virtual 3-D environment, which also requires significant manual labor, as it implies effectively recreating the entire movie with 3-D objects, backgrounds and cameras.

SUMMARY

One implementation of the present disclosure may take the form of a method for generating a stereoscopic image from a two dimensional image. The method may comprise the operations of obtaining a first two dimensional digital image comprising a first plurality of pixel values and obtaining a first gradient model comprising a first plurality of depth attributes. The method may also include the operations of obtaining a first two dimensional digital image comprising a second plurality of pixel values corresponding to the first plurality of pixel values and applying the first gradient model to the second plurality of pixel values to horizontally offset one or more of the second plurality of pixel values relative to the first plurality of pixel values based upon the depth attributes of the first gradient model.

Another implementation of the present disclosure may take the form of a method for generating a stereoscopic frame. The method may comprise the operations of extracting a layer from a two dimensional frame, wherein the layer comprises a first portion and a second portion of the two dimensional frame and obtaining a gradient model comprising a gray scale template having a plurality of gray scale values relative to each of the first portion and second portion. The method may also include the operations of altering the shape of the gradient model to approximate a portion of the two dimensional frame and generating a duplicate layer comprising a duplicate of the first image portion and a duplicate of the second image portion. The method may further include horizontally offsetting the first image portion relative to the duplicate of the first image portion a first amount based on a portion of the plurality of gray scale values and the second image portion relative to the duplicate of the second image a second amount, different from the first amount, based on a portion of the plurality of gray scale values. Further, the layer and the duplicate of the layer are displayed substantially contemporaneously for stereoscopic viewing of the image.

Yet another implementation of the present disclosure may take the form of a system for generating stereoscopic images from a two dimensional planar image. The system may comprise one or more computing devices coupled with a storage medium storing one or more two dimensional frames. The storage medium may further include a plurality of digital geometric shape models, with each given geometric shape model representing depth as a gray scale value and representative of one or more basic geometric shapes. The one or more computing devices may be further configured to perform the operations of retrieving a two dimensional digital image comprising a first plurality of pixel values and selecting a first gradient model from the plurality of digital geometric shape models. The first gradient model may comprise a gray scale template having a plurality of gray scale values relative to each of the first plurality of pixel values. The computing device may be further configured to perform the operations of obtaining a copy of the two dimensional image comprising a second plurality of pixel values corresponding to the first plurality of pixel values and horizontally displacing one or more of the second plurality of pixel values based upon the plurality of gray scale values for the first plurality of pixel values.

DETAILED DESCRIPTION

Figure 1:
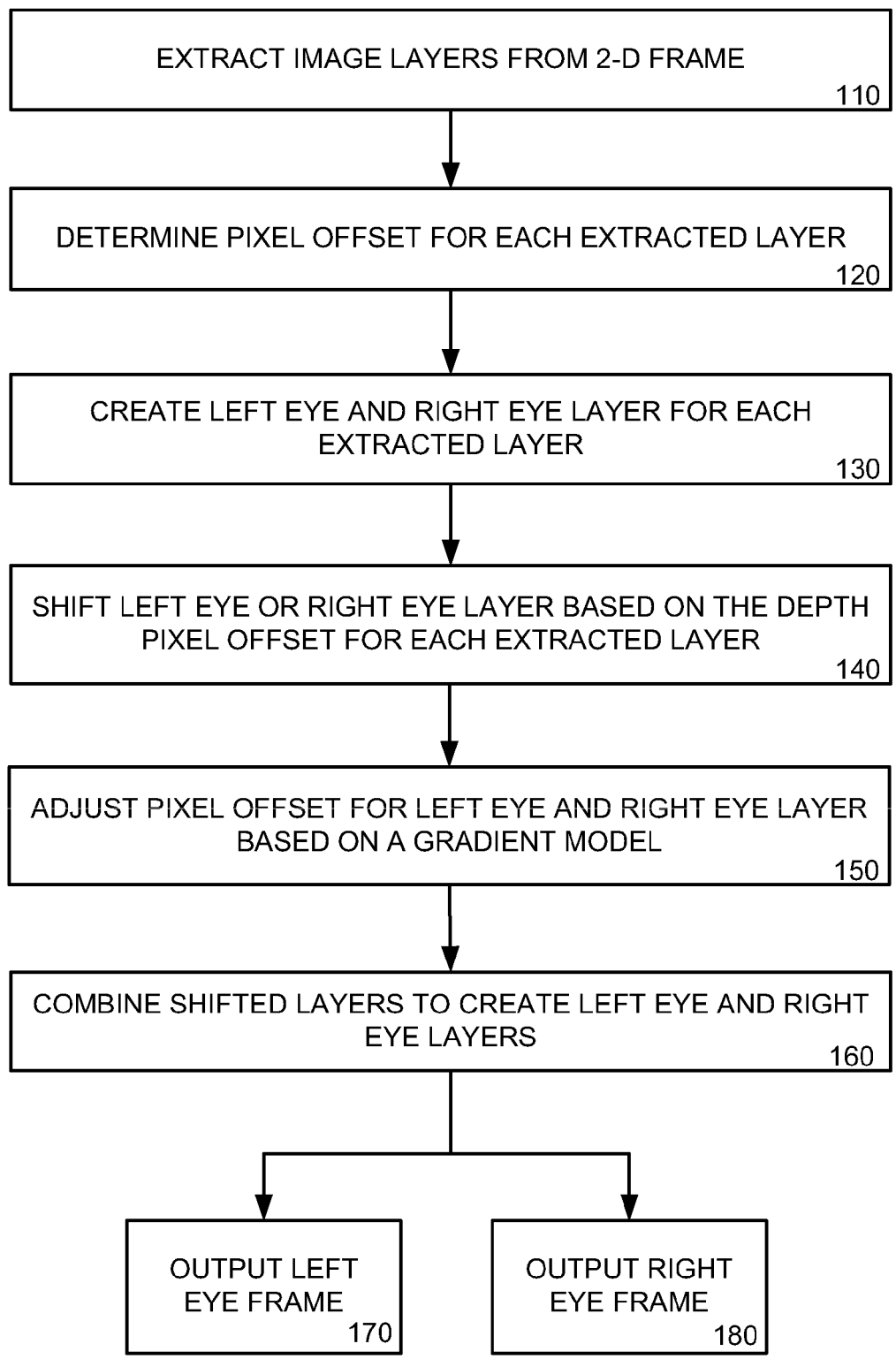
FIG. 1 is a flowchart of a method for converting a 2-D image to a stereoscopic 3-D image by extracting one or more object layers of the 2-D image and applying a pixel offset to each layer.

Aspects of the present disclosure involve methods and systems for generating stereoscopic depth and volume from a 2-D planar image by applying any of a plurality of gradient models to a 2-D image or feature of an image, and then providing the 2-D image or feature with stereoscopic depth and volume based on perceptual depth values of the gradient model. Through techniques discussed herein, a two-dimensional object may be stereoscopically placed along a perceptual z-axis by creating a copy of the two dimensional object, and horizontally and uniformly displacing the copy relative to the original. In one implementation, the pixel values in a copy of the image are displaced along the x-axis relative to the pixel values of the original image, and the degree of offset, when the copy and original are displayed for viewing in a stereoscopic environment, determines the direction and magnitude of the images location along the perceptual z-axis. Further, a two-dimensional object may be provided with stereoscopic volume by non-uniformly displacing some portions of the object copy relative to the original. Aspects of the present disclosure involve a toolkit of templates, such as shapes and jointed shapes, with stereoscopic depth map attributes. The system uses the depth map attributes of the shape to create stereoscopic volume for the image feature with a similar shape. The shape as well as the depth map attributes may be adjustable. In one particular implementation, the shapes have variable gradient gray scale attributes. The gray scale attributes of the shape, which corresponds to some image portion, are used to horizontally offset pixel values of a right or left eye image portion corresponding to the original left or right eye image. When the right and left eye images are displayed in accordance with a stereopticon viewing environment, the original image will have taken on stereoscopic volume for the portion of image processed with the toolkit shape.

The templates upon which the pixel offset for one or more pixels of the 2-D image may be adjusted provides the 2-D image with a finely tuned, nuanced stereoscopic 3-D effect when rendered in a stereoscopic 3-D environment. In this manner, the 2-D image may be converted to a corresponding 3-D image with a perceived depth. Further, this process may be applied to each image of an animated feature film to convert the film from 2-D to stereoscopic 3-D.

For convenience, the embodiments described herein refer to a 2-D image as a "frame" or "2-D frame." However, it should be appreciated that the methods and devices described herein may be used to convert any 2-D multimedia image into a stereoscopic 3-D image, such as 2-D multimedia images including a photo, a drawing, a computer file, a frame of a live action film, a frame of an animated film, a frame of a video or any other 2-D multimedia image. Further, the term "layer" as used herein indicates any portion of a 2-D frame, including any object, set of objects, or one or more portions of an object from a 2-D frame. Thus, the depth model effects described herein may be applied to any portion of a 2-D frame, irrespective of whether the effects are described with respect to layers, objects or pixels of the frame.

FIG. 1 is a flowchart of a method for converting a 2-D multimedia frame to a stereoscopic 3-D multimedia frame by utilizing layers of the 2-D frame. Several operations of the method are described in detail in related United States patent application Ser. No. 12/571,407, entitled "METHOD AND SYSTEM FOR UTILIZING PRE-EXISTING IMAGE LAYERS OF A TWO DIMENSIONAL IMAGE TO CREATE A STEREOSCOPIC IMAGE" by Tara Handy Turner et. al., the contents of which are incorporated in their entirety by reference herein. By performing the following operations for each frame of a 2-D animated film and combining the converted frames in sequence, the animated 2-D film may similarly be converted into a stereoscopic 3-D film. In one embodiment, the operations may be performed by one or more workstations or other computing systems to convert the 2-D frames into stereoscopic 3-D frames.

Figure 2:
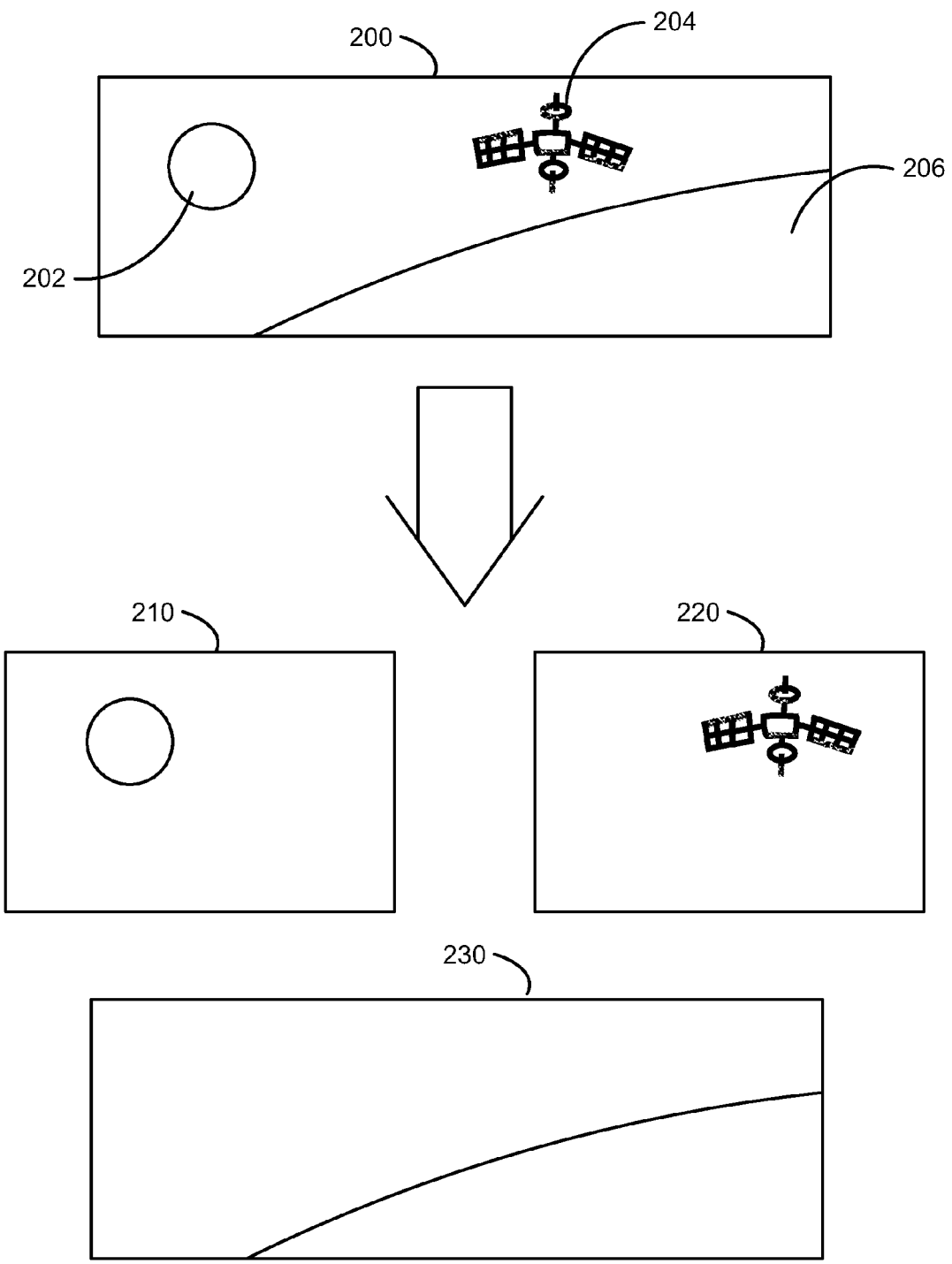
FIG. 2 is a diagram illustrating a plurality of layers of an image of an animated multimedia presentation.

The method may begin in operation 110 where one or more layers are extracted from the 2-D frame by a computer system. A layer may comprise one or more portions of the 2-D frame. The example 2-D frame 200 of FIG. 2 illustrates a space scene including three objects; namely, a moon 202, a satellite 204 and a planet 206. Each of these objects are extracted from the 2-D image or otherwise provided as separate layers of the frame 200. The layers of the 2-D image 200 may include any portion of the 2-D image, such as an object, a portion of the object or a single pixel of the image. As used herein, a layer refers to a collection of data, such as pixel data, for a discrete portion of image data where the meaningful color data exists for the entirety of the image or, in some examples, for some area less than the entirety of image data. For example, if an image consists of a moon 202, satellite 204 and a planet 206, image data for the moon may be provided on a layer and image data for the satellite and planet may be provided on separate and distinct layers. In general, each layer of a 2-D image is the same size as all of the other layers, such that those pixels of the layer that are not part of the objects of the layer are blank or otherwise carry no color information. However, the layers of the 2-D image may be any size and include any number of pixels.

The layers can be extracted from the composite 2-D frame in several ways. For example, the content of each extracted layer can be digitally extracted from the 2-D frame by a computing system utilizing a rotoscoping tool or other computer image processing tool to digitally remove a given object (s) and insert a given object(s) into a distinct layer. In another example, the layers for a 2-D frame may be digitally stored separately in a computer-readable database. For example, distinct layers pertaining to each frame of a cell animated feature film may be digitally stored in a database, such as the Computer Animation Production System (CAPS) developed by the Walt Disney Company in the late 1980s.

Figure 3:
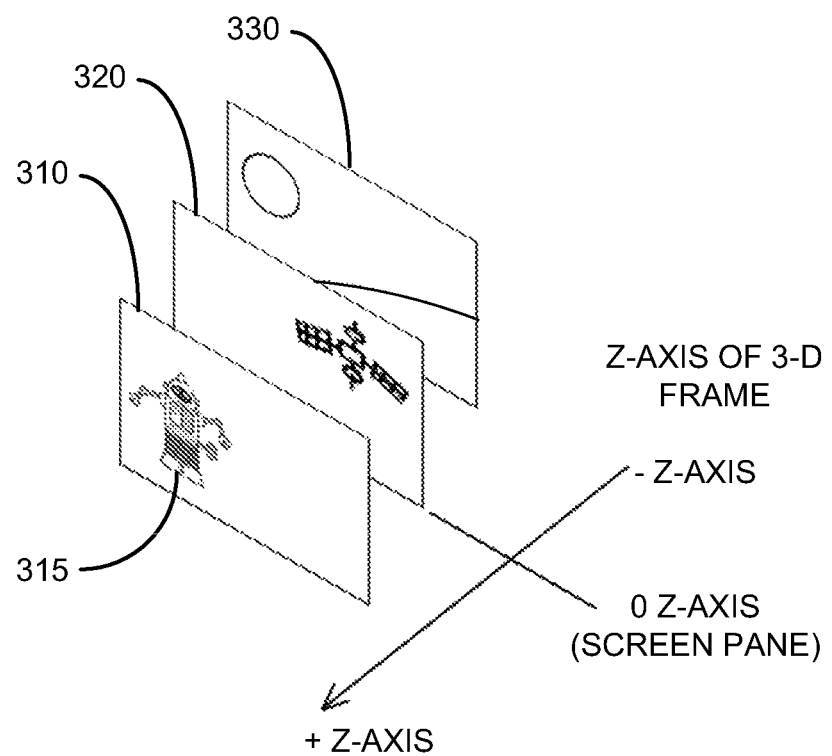
FIG. 3 is a diagram illustrating the position of several layers of a stereoscopic 3-D frame along a perceptual z-axis of the stereoscopic 3-D frame.

Upon extraction of a layer or otherwise obtaining layer pixel data, a user or the computing system may determine a pixel offset for the layer pixel data in operation 120. Each pixel, or more likely a collection of adjacent pixels, of the 2-D frame may have an associated pixel offset that determines the object's perceived depth in the corresponding stereoscopic 3-D frame. For example, FIG. 3 is a diagram illustrating the perceived position of several layers of a stereoscopic 3-D frame along a z-axis of the stereoscopic 3-D frame. As used herein, the z-axis of a stereoscopic 3-D frame or image represents the perceived position of a layer of the frame when viewed as a stereoscopic 3-D image. In one particular embodiment, any layer 310 of the stereoscopic 3-D frame appearing in the foreground of the frame has a corresponding positive z-axis position that indicates the position of the layer relative to the plane of the screen from which the stereoscopic 3-D frame is presented. Additionally, any layer 330 appearing in the background of the stereoscopic 3-D frame has a corresponding negative z-axis position while a layer 320 appearing on the plane of the screen may have a zero z-axis position. However, it should be appreciated that the layers of the frame are not physically located at a z-axis positions described herein. Rather, because the stereoscopic 3-D frame appears to have depth when viewed in stereoscopic 3-D, the z-axis position merely illustrates the perceived position of a layer relative to the screen plane of the stereoscopic 3-D frame. This position, and hence the screen plane in this example, very often corresponds to what is known as the point of convergence in a stereoscopic system. Further, it is not necessary that a positive z-axis position correspond to the layer appearing in the foreground of the stereoscopic 3-D frame and a negative z-axis position correspond to the layer appearing in the background. Rather, any value may correspond to the perceived position of the layer of the stereoscopic 3-D frame as desired. For example, in some computer systems, layers that are perceived in the background of the stereoscopic 3-D frame may have a positive z-axis position while those layers in the foreground have a negative z-axis position. In still another example, the zero z-axis position corresponds with the furthest perceived point in the background of the stereoscopic 3-D frame. Thus, in this example, every layer of the stereoscopic 3-D frame has a positive z-axis position relative to the furthest perceived point in the background. As used herein, however, a z-axis position value corresponds to the example shown in FIG. 3.

In the example of FIG. 3, each pixel of any particular layer of the 2-D frame has the same pixel offset. Thus, each object of the layer appears at the same z-axis position within the stereoscopic 3-D frame. Moreover, while each object, e.g. the moon 202, the satellite 204 and the planet 206, are given a z-axis depth, each object appears flat or with no volume. Stated differently, initially a pixel offset is applied uniformly to all pixels of a given object or layer. To provide a non-flat appearance of a given object and a more realistic stereoscopic 3-D effect, the pixel offset of one or more pixels of the layer is adjusted to add volume or a more detailed depth perception to the objects of the layer, or to otherwise provide non-uniformity to the object through variable pixel offsets.

For example, returning to FIG. 2, the moon 202 object has a round shape. While the stereoscopic depth of the moon layer 210 layer provides a stereoscopic depth as to the orientation of the moon in relation to the other shapes of the frame, the moon object itself still appears flat. Thus, to provide a volume stereoscopic 3-D effect to the moon 202 object, pixel offset for the pixels defining the moon object are adjusted such that the pixels of the moon are located either in the foreground or background of the stereoscopic 3-D frame in relation to the moon layer 210, or are not adjusted and are maintained at the moon layer, thereby providing the moon object with stereoscopic volume. Several techniques to apply volume to the layers of an frame are described in greater detail in related U.S. patent application Ser. No. 12/571,406 entitled "METHOD AND SYSTEM FOR CREATING DEPTH AND VOLUME IN A 2-D PLANAR IMAGE" by Tara Handy Turner et. al., the entirety of which is incorporated by reference herein. This volume process may be applied to any layer of the 2-D frame, including being applied to one or more objects of a particular layer. Thus, the volume applied to one object of a particular layer may differ from the volume applied to a separate object of the same layer. Generally, the stereoscopic volume may be applied individually to any aspect of the 2-D frame. Moreover, stereoscopic volume may be applied to any given object irrespective of its relation to a layer or any other object.

Additional stereoscopic techniques for pixel offset may be utilized to provide this volumetric and depth detail to the stereoscopic 3-D effect applied to the 2-D frame. One such adjustment involves utilizing gradient models corresponding to one or more frame layers or objects to provide a template upon which a pixel offset adjustment may be made to one or more pixels of the 2-D frame. For example, returning to FIG. 2, it may be desired to curve the planet 206 object of the planet layer 230 such that the planet appears to curve away from the viewer of the stereoscopic 3-D frame. To achieve the desired appearance of the planet 206, a gradient model similar in shape to the planet 206 object may be selected and adjusted such that the gradient model corresponds to the planet object and provides a template from which the desired stereoscopic 3-D effect may be achieved for the object. Further, in those layers that include several objects of the 2-D frame, gradient models may be created for one or more objects such that a single stereoscopic 3-D effect is not applied to every object of the layer. In one embodiment, the gradient model may take the form of a gray scale template corresponding to the object, such that when the frame is rendered in stereoscopic 3-D, the whiter portions of the gray scale gradient model corresponds to pixels of the object that appear further along the z-axis position (either in the foreground or background) of the layer than the pixels of the object that correspond to the darker portions of the gradient model, such that the object appears to extend towards or away from the viewer of the stereoscopic 3-D frame. Several techniques related to creating depth models to render a 2-D frame in stereoscopic 3-D frame are described in more detail herein.

Once the desired depth pixel offset and the adjusted pixel offset based on a volume effect or gradient model are determined for each layer and pixel of the 2-D frame in operation 120, corresponding left eye and right eye frames are generated for each layer in operation 130 and shifted in response to the combined pixel offset in operation 140 to provide the different perspectives of the layer for the stereoscopic visual effect. For example, to create a left eye or right eye layer that corresponds to a layer of the 2-D frame, a digital copy of the 2-D layer is generated and shifted, either to the left or to the right in relation to the original layer, a particular number of pixels based on the pixel offset for relative perceptual z-axis positioning and/or individual object stereoscopic volume pixel offsetting. Hence, the system generates a frame copy of the layer information with the x-axis or horizontal pixel values shifted uniformly some value to position the object along a perceptual z-axis relative to other objects and/or the screen, and the system further alters the x-axis or horizontal pixel position for individual pixels or groups of pixels of the object to give the object stereoscopic volume. When the corresponding left eye and right eye frames are viewed simultaneously or nearly simultaneously, the object appearing in the corresponding frames appears to have volume and to be in the foreground or background of the stereoscopic 3-D frame, based on the determined pixel offset.

In general, the shifting or offsetting of the left or right eye layer involves the horizontal displacement of one or more pixel values of the layer. For example, a particular pixel of the left or right eye layer may have a pixel color or pixel value that defines the pixel as red in color. To shift the left or right eye layer based on the determined pixel offset, the pixel value that defines the color red is horizontally offset by a certain number of pixels or other consistent dimensional measurement along the x-axis or otherwise horizontal, such that the new or separate pixel of the layer now has the shifted pixel value, resulting in the original pixel horizontally offset from the copy. For example, for a pixel offset of 20, a pixel of the left or right eye layer located 20 pixels either to the left or the right is given the pixel value defining the color red. Thus, there is a copy of the pixel horizontally offset (x-offset) from the original pixel, both with the same color red, 20 pixels apart. In this manner, one or more pixel values of the left or right eye layer are horizontally offset by a certain number of pixels to created the shifted layer. As used herein, discussion of "shifting" a pixel or a layer refers to the horizontal offsetting between the original pixel value and its copy.

Figure 4:
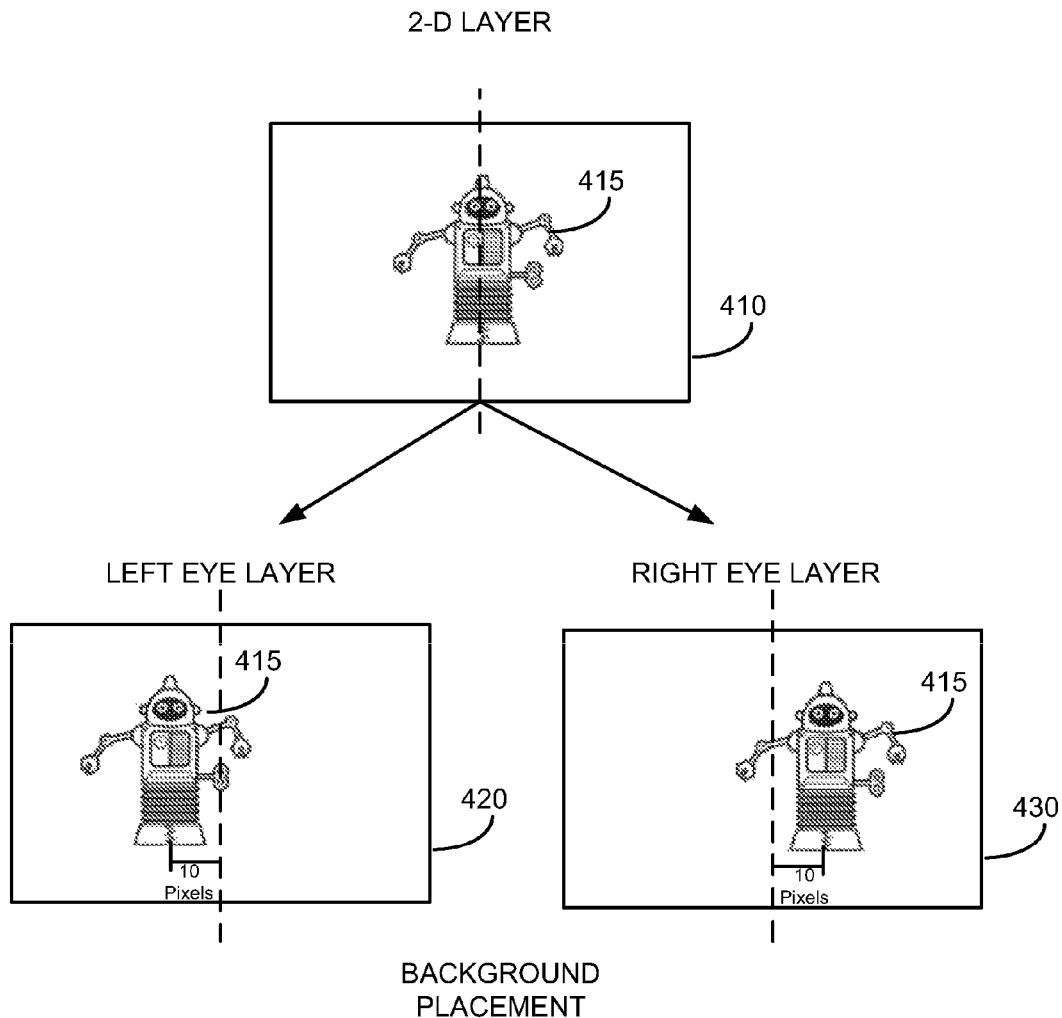
FIG. 4 is a diagram illustrating the creation of corresponding left eye and right eye image layers from a 2-D image layer, with both image layers shifted such that the total pixel shift of the image layers equals a determined pixel offset.

FIG. 4 is a diagram illustrating the creation of corresponding left eye and right eye layers from a 2-D layer, with both left eye and right eye layers shifted such that the total pixel shift of the layers equals the depth pixel offset. As shown in FIG. 4, a left eye layer 420 and a right eye layer 430 are created from the 2-D layer 410 such that the combination of the left eye layer and the right eye layer provides a stereoscopic 3-D effect to the contents of the layer. In this embodiment, the left eye layer 420 is shifted to the left while the right eye layer 430 is shifted to the right along the x-axis in response to a pixel offset. Generally, the shifting of the left eye and/or right eye layers occur in the x-axis only. When the shifted right eye layer 430 and the shifted left eye layer 420 are viewed together, the robot character 415 appears in the background, or behind the screen plane. To place a layer in the foreground of the stereoscopic 3-D frame, the corresponding left eye layer 410 is shifted to the right while the right eye layer 420 is shifted to the left along the x-axis. When the shifted right eye layer 420 and the shifted left eye layer 410 are viewed together, the robot character 415 appears in the foreground of the frame, or in front of the screen plane. In general, the depth pixel offset is achieved through the shifting of one of the left eye or right eye layers or the combined shifting of the left eye and the right eye layers in either direction.

The number of pixels that one or both of the left eye and right eye layers are shifted in operation 140 may be based on the depth pixel offset value. In one example, the pixel offset may be determined to be 20 total pixels, such that the layer may appear in the background of the stereoscopic 3-D frame. Thus, as shown in FIG. 4, the left eye layer 420 may be shifted ten pixels to the left from the original placement of the 2-D layer 410, while the right eye layer 430 may be shifted ten pixels to the right. As can be seen, the robot character 415 of the left eye layer 420 has been displaced ten pixels to the left of the center depicted by the vertical dashed line while right eye layer 430 has been displaced to the right of center by ten pixels. Thus, the total displacement of the layers between the left eye layer 420 and the right eye layer 430 is 20 pixels, based on the determined pixel offset. It should be appreciated that the particular number of pixels that each layer is shifted may vary, as long as the number of pixels shifted for both layers equals the overall pixel offset. For example, for a 20 pixel offset, the left layer may be shifted five pixels while the right layer may be shifted 15 pixels. Shifting the left and right eye layers in this way will result in a slightly different perspective of the layer than shifting in equal amounts, but this result may generate a desired creative effect or may be negligible to the viewer while being advantageous for the purposes of simplifying an image processing step such as the extraction of the layer.

Returning to FIG. 1, in operation 150, the computer system adjusts the pixel offset of a layer or object based on a stereoscopic volume or applied gradient model. The system orients a given object or layer along a perceptual z-axis by generating a copy of the object or layer and positioning the object and its copy relative to each other along an x-axis or horizontally. The degree of relative positioning determines the degree of perceptual movement fore and aft along the perceptual z-axis. However, a given object initially appears flat as the object and its copy are uniformly displaced. To provide an object with stereoscopic volume and depth, portions of an object and the corresponding portion of the object copy are relatively positioned differently (more or less) than other portions of the object. For example, more or less x-axis pixel offset may be applied to some portion of an object copy relative to other portions of an object copy, to cause the perceived position of some portion of the object to be at a different position along the perceptual z-axis relative to other portions of the object when the left and right eye layers are displayed.

In one embodiment, a gradient model including a gray scale template is created and applied to an object or layer of the 2-D frame such that, after application of the pixel offset to the left eye layer and the right eye layer, the whiter portions of the gradient model correspond to areas of the 2-D image that appear further in the foreground than the areas corresponding to the darker portions. Stated differently, the gradient model gray scale provides a map or template from which the adjusted pixel offset for each pixel of an object or layer may be determined. In this manner, stereoscopic volume and depth is applied to an object for a more detailed stereoscopic appearance of one or more objects of the frame. It should be appreciated, however, that the gradient model may include any method to represent depth, other than a gray scale template. For example, the gradient model may include a plurality of colors, a collection of numeric values, or simple instructions to represent depth. One example of simple instructions include a direction (background or foreground) and a degree of depth that relates to a pixel offset. It should be noted that the specified pixel offset is a creative determination defining the desired perceived location of the feature to the viewer, which can be derived by utilizing the direct mathematical relationships between the relative position of the viewer to the screen plane, the horizontal size of the screen plane and the pixel resolution of the stereoscopic frame being viewed.

Therefore, based on the determined depth pixel offset (which perceptually positions a layer along the perceptual z-axis of the stereoscopic 3-D frame) and the gradient model pixel offset (which adjusts the depth pixel offset for one or more pixels of an object to provide the object with the appearance of having volume and a more detailed depth), the left eye layer and right eye layer, and specific portions of the left and/or right eye layer, are shifted to provide the stereoscopic 3-D frame with the desired stereoscopic 3-D effect. Thus, in some embodiments, each pixel of a particular stereoscopic 3-D frame may have an associated pixel offset that may differ from the pixel offsets of other pixels of the frame. In general, any pixel of the 2-D frame may have an associated pixel offset to place that pixel in the appropriate position in the rendered stereoscopic 3-D frame.

Operations 110 through 150 may repeated for each layer of the 2-D frame such that corresponding left eye layers and right eye layers are created for each layer of the frame. Thus, upon the creation of the left eye and right eye layers, each layer of the frame has two corresponding layers (a left eye layer and a right eye layer) that is shifted in response to the depth pixel offset for that layer and to the volume pixel offset for the objects of the layer.

In operation 160, the computer system combines each created left eye layer corresponding to a layer of the 2-D frame with other left eye layers corresponding to the other layers of the 2-D frame to construct the complete left eye frame to be presented to the viewer. Similarly, the computer system combines each right eye layer with other right eye layers of the stereoscopic 3-D frame to construct the corresponding right eye frame. The combined left eye frame is output for the corresponding stereoscopic 3-D frame in operation 170 while the right eye frame is output for the corresponding stereoscopic 3-D frame in operation 180. When viewed simultaneously or nearly simultaneously, the two frames provide a stereoscopic effect to the frame, converting the original 2-D frame to a corresponding stereoscopic 3-D frame. For example, some stereoscopic systems provide the two frames to the viewer at the same time but only allows the right eye to view the right eye frame and the left eye to view the left eye frame. One example of this type of stereoscopic systems is a red/cyan stereoscopic viewing system. In other systems, the frames are provided one after another while the system limits the frames to the proper eye. Further, to convert a 2-D film to a stereoscopic 3-D film, the above operations may be repeated for each frame of the film such that each left eye and right eye frame may be projected together and in sequence to provide a stereoscopic 3-D effect to the film.

Figure 5:
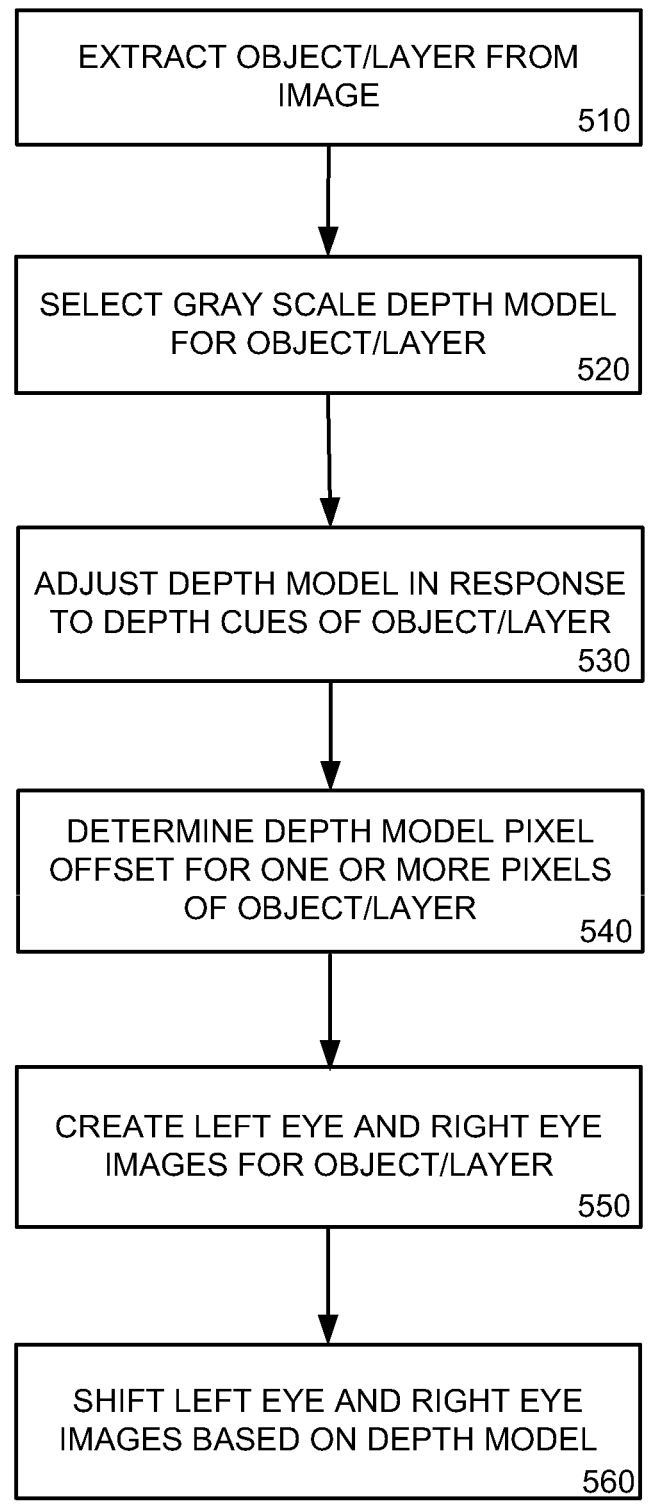
FIG. 5 is a flowchart of a method for adding depth to a 2-D image through the utilization of a gradient model.

As described, the stereoscopic 3-D effects of a frame may be based on variety of techniques, such as perceptual z-axis positioning, inflation (stereoscopic volume) and use of gradient models. The utilization of a gradient model, also referred to as templates, to create an stereoscopic 3-D effect to the frame is discussed herein. Particularly, FIG. 5 is a flowchart of a method for generating stereoscopic depth for one or more objects of a 2-D frame through the utilization of a gradient model. The operations of FIG. 5 may be performed by one or more computing systems, with some creative input and manipulation by an animator or artist. The method of FIG. 5 is described in the context of generating stereoscopic volume and depth for an object or layer, which is obtained from a collection of layers that form a frame of a film. The method of FIG. 5, however, is not limited to such an environment and may be applied to a discrete image or a portion of an image in digitized form, although the image may originate from a hand drawn picture.

Beginning in operation 510, one or more layers or objects are extracted from the 2-D frame, selected or otherwise obtained. In operation 520, the computer system obtains a gray scale gradient model for application to the extracted layer such that each pixel of the gradient model corresponds to one or more pixels of the layer. The system may obtain a gradient model by automated comparison of the image shape against a plurality of gradient model shapes. Alternatively, a user may select a gradient model, from a plurality of gradient models, with a shape similar to that of the image for which the model will be used to provide stereoscopic depth. The gradient models may include a gray scale template comprising various shades of a gray color (including white and black) for each pixel of the gradient model. Several examples of gray scale gradient models are discussed herein, but it should be appreciated that the gradient models may take any shape. In one embodiment, the computer system may select from a list of several gradient models to apply to the layer or portions of the layer. In another embodiment, the gradient model may be drawn or otherwise created to correspond to a layer, an object or a portion of either. For example, a layer may include a character object of a 2-D frame. However, it may be desired to provide a stereoscopic 3-D effect to the arm of the character separate from the rest of the character object, such as if the character is pointing into the foreground of the stereoscopic 3-D frame. In this example, a gradient model may be created that takes the relative shape of the arm of the character, or closely resembles the general arm shape, such that the pixel offsets corresponding to the pixels defining the character's arm may be determined to provide the appearance that the arm has a stereoscopic 3-D depth.

It is also possible to apply different gradient models to different portions of an image. For example, in the context of an image of a hot air balloon, a circular gradient model, perhaps after being elongated, may be used to provide the balloon portion with stereoscopic depth, whereas a rectangular gradient model may be used to provide the basket portion with stereoscopic depth.

Figure 6:
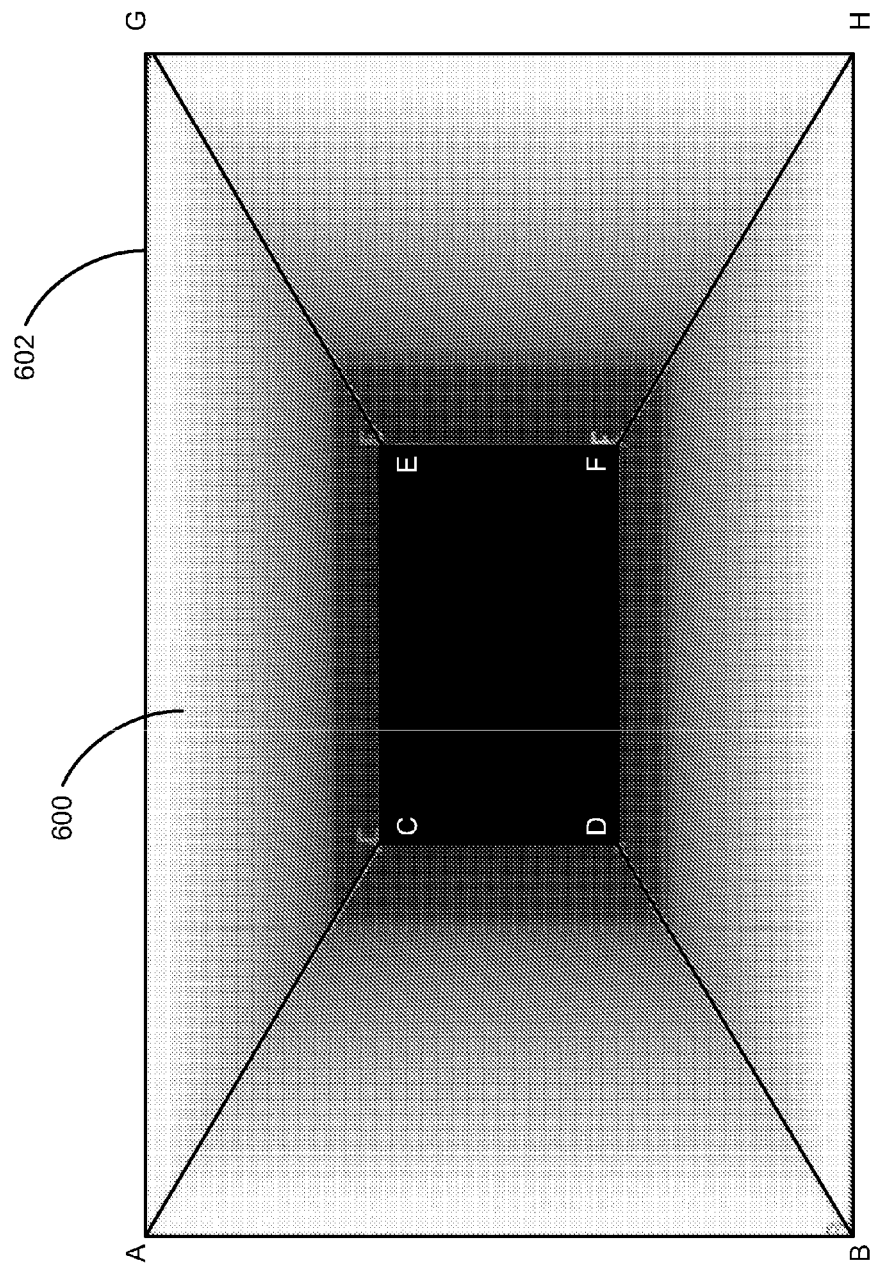
FIG. 6 is a diagram of a trapezoidal gradient model for adding depth to a 2-D image when rendered in stereoscopic 3-D.
Figure 10:
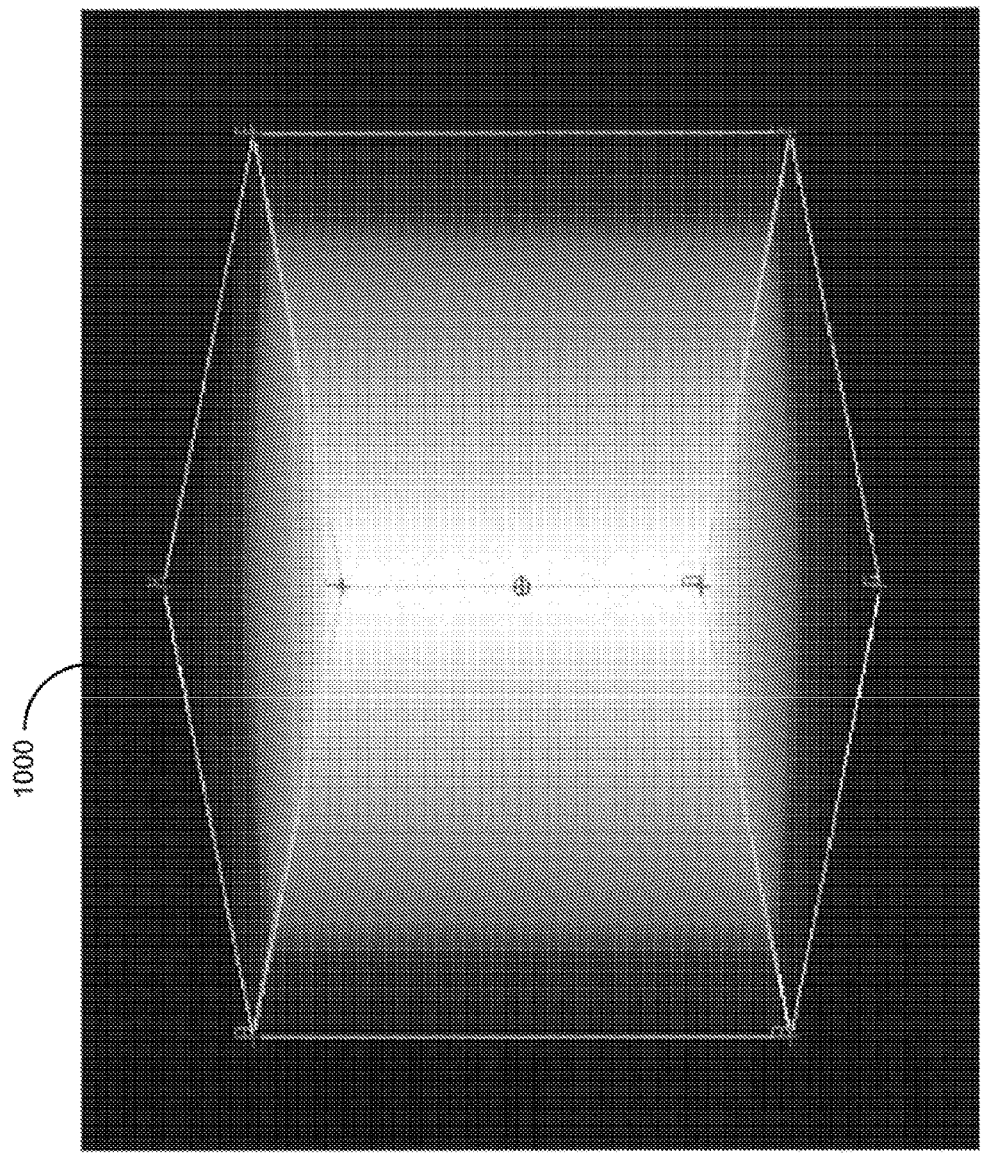
FIG. 10 is a diagram of a cube point gradient model for adding depth and volume to a 2-D image when rendered in stereoscopic 3-D.
Figure 11:
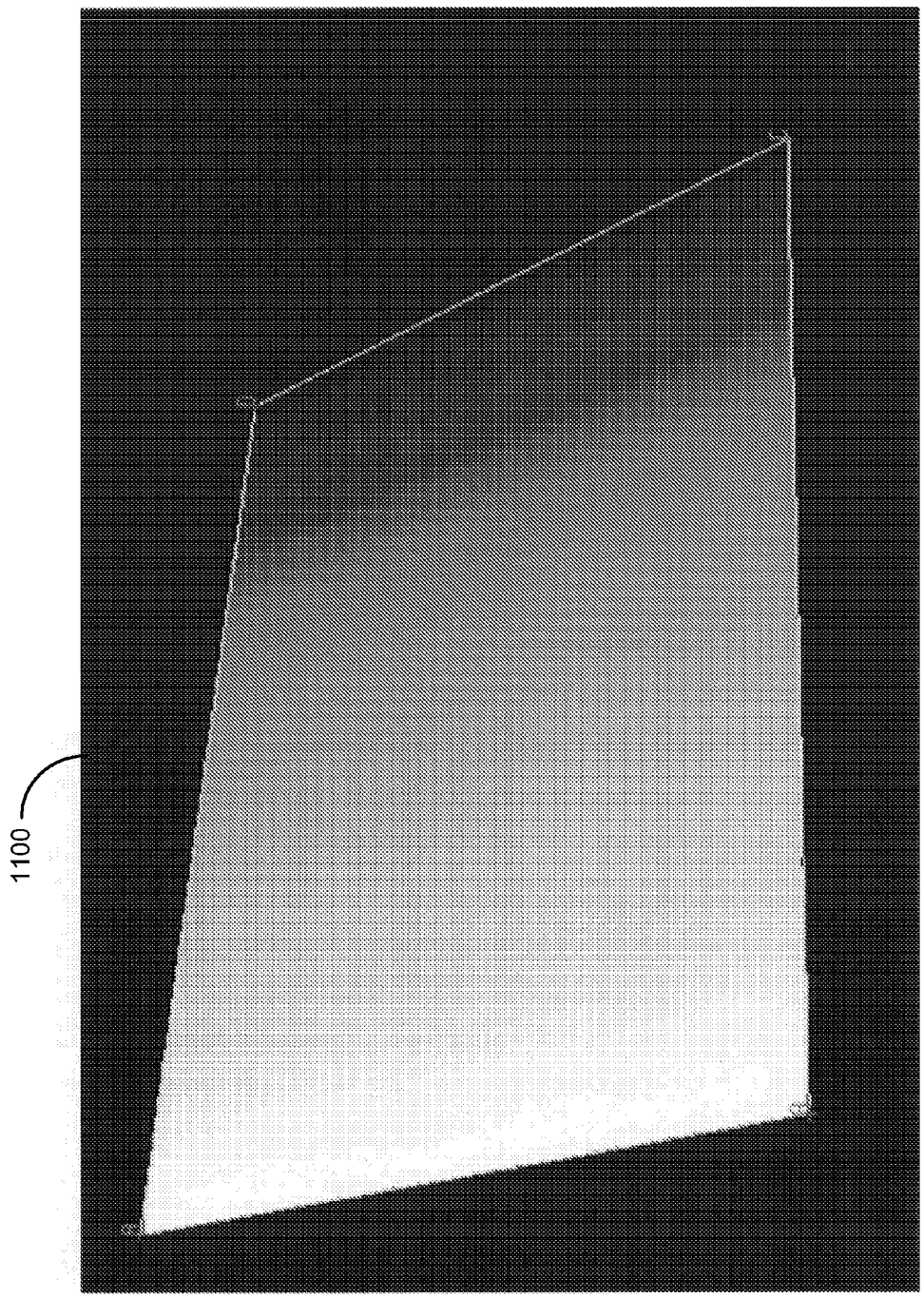
FIG. 11 is a diagram of a quadrangle gradient model for adding depth and volume to a 2-D image when rendered in stereoscopic 3-D.
Figure 12:
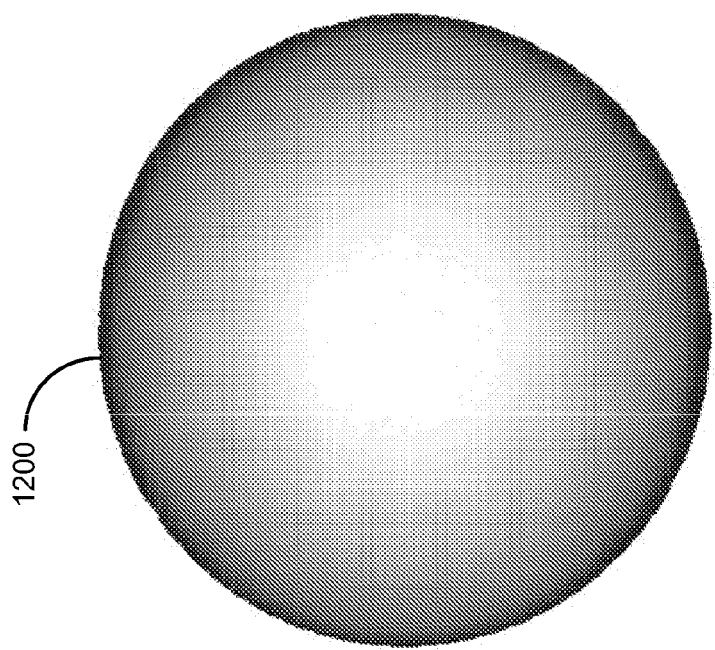
FIG. 12 is a diagram of a radial gradient model for adding depth and volume to a 2-D image when rendered in stereoscopic 3-D.
Figure 13:
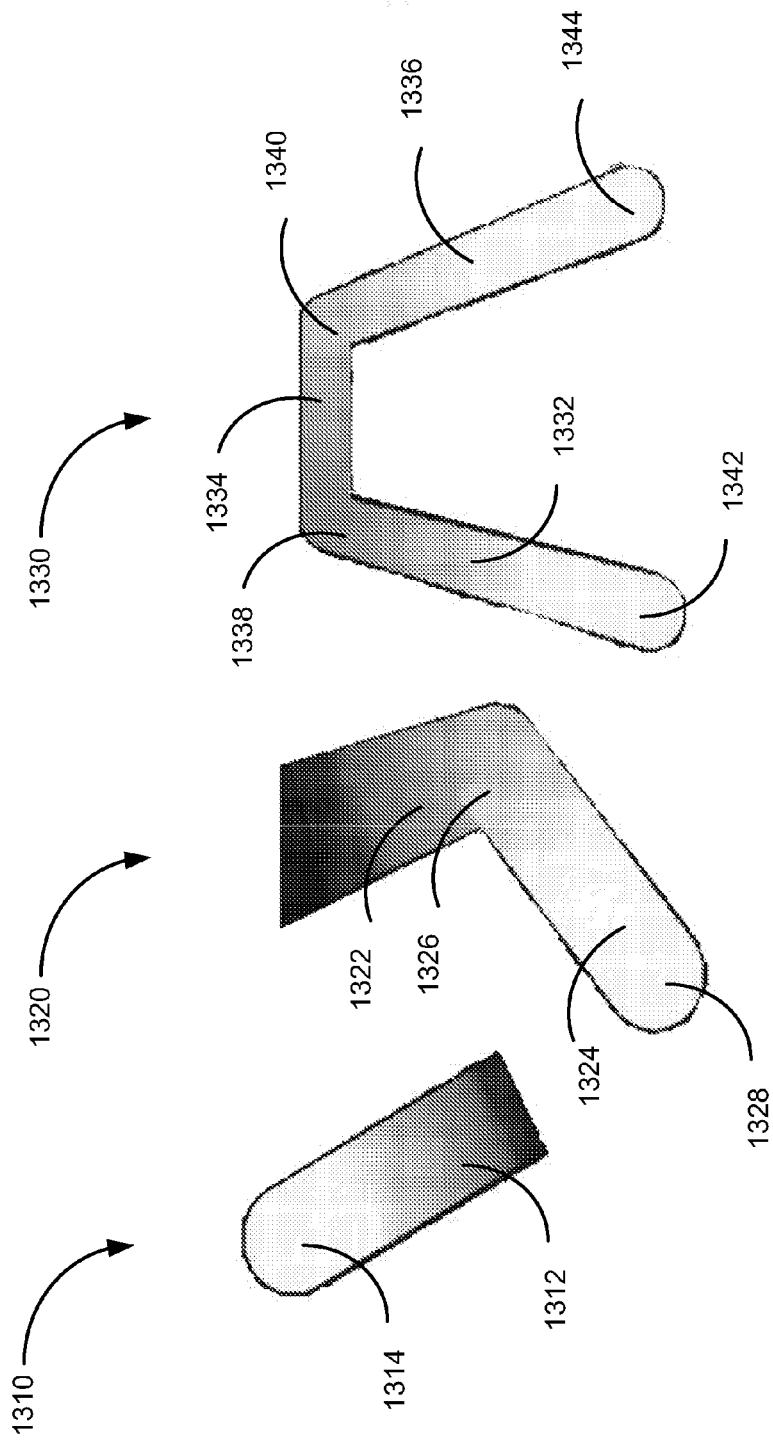
FIG. 13 is a diagram of a plurality of jointed gradient models for adding depth and volume to a 2-D image when rendered in stereoscopic 3-D.

Several examples of gradient models are provided herein. FIG. 6 is a diagram of a trapezoidal gradient model that may be selected to provide a tunnel stereoscopic effect to an object, for example. FIG. 10 is a diagram of a cube point gradient model that may be used to provide volume and depth to a house or a room, for example. FIG. 11 is a diagram of a quadrangle gradient model that may be utilized to provide a road or ground level the appearance of coming into the foreground and falling into the background, for example. FIG. 12 is a radial gradient model that provides a rounded object with the appearance of volume, for example. FIG. 13 includes several diagrams of jointed gradient models that may be used to provide an arm of a character object or other jointed object the appearance of extending into the background or foreground of a stereoscopic 3-D frame. The gradient models may be fixed in shape and size, or may include one or more control points that a user may select to alter the size and shape of the gradient model.

The operations of FIG. 5 are described herein with relation to the gradient model illustrated in FIG. 6. However, any gradient model may be used in relation to the operations of FIG. 5. As described, FIG. 6 is a diagram of a first example of a gray scale gradient model, namely a trapezoidal gradient model for determining a pixel offset of the pixels of a 2-D frame. This particular gradient model 600 comprises several trapezoid shapes bounded by a larger rectangle 602 (defined by points A, B, G and H) and a smaller second rectangle shape 604 (defined by points C, D, E and F) located within the larger rectangle. Further, the edges of the trapezoid shapes are defined by a line connecting the corners of the larger rectangle 602 to the smaller rectangle 604. The depth model also includes a gray scale template that is bounded by the trapezoidal shapes, such that the larger rectangle defines the outer boundary of the gray scale template and the smaller rectangle defines the inner boundary of the gray scale template. Further, the color of the gray scale template varies across the trapezoidal gradient model 600 such that the edges defined by the larger rectangle 602 of the gray scale template are whiter in color than the edges defined by the smaller rectangle 604, which are black or nearly black. Thus, the gray scale template defines a shape bounded by the larger and smaller rectangles that transitions uniformly from a white color near the outer edges 602 to a black color at the inner edges 604. However, it is not required that the gray scale template be applied in such a manner. Generally, a gray scale template may correspond to an object in any manner such that each pixel of the template corresponds to one or more pixels of the object and includes a shade of gray (including white and black) from which a pixel offset may be determined. For example, the outer boundary may be black and the inner boundary white, or each point (A through H) may have a unique value between black and white.

Figure 7:
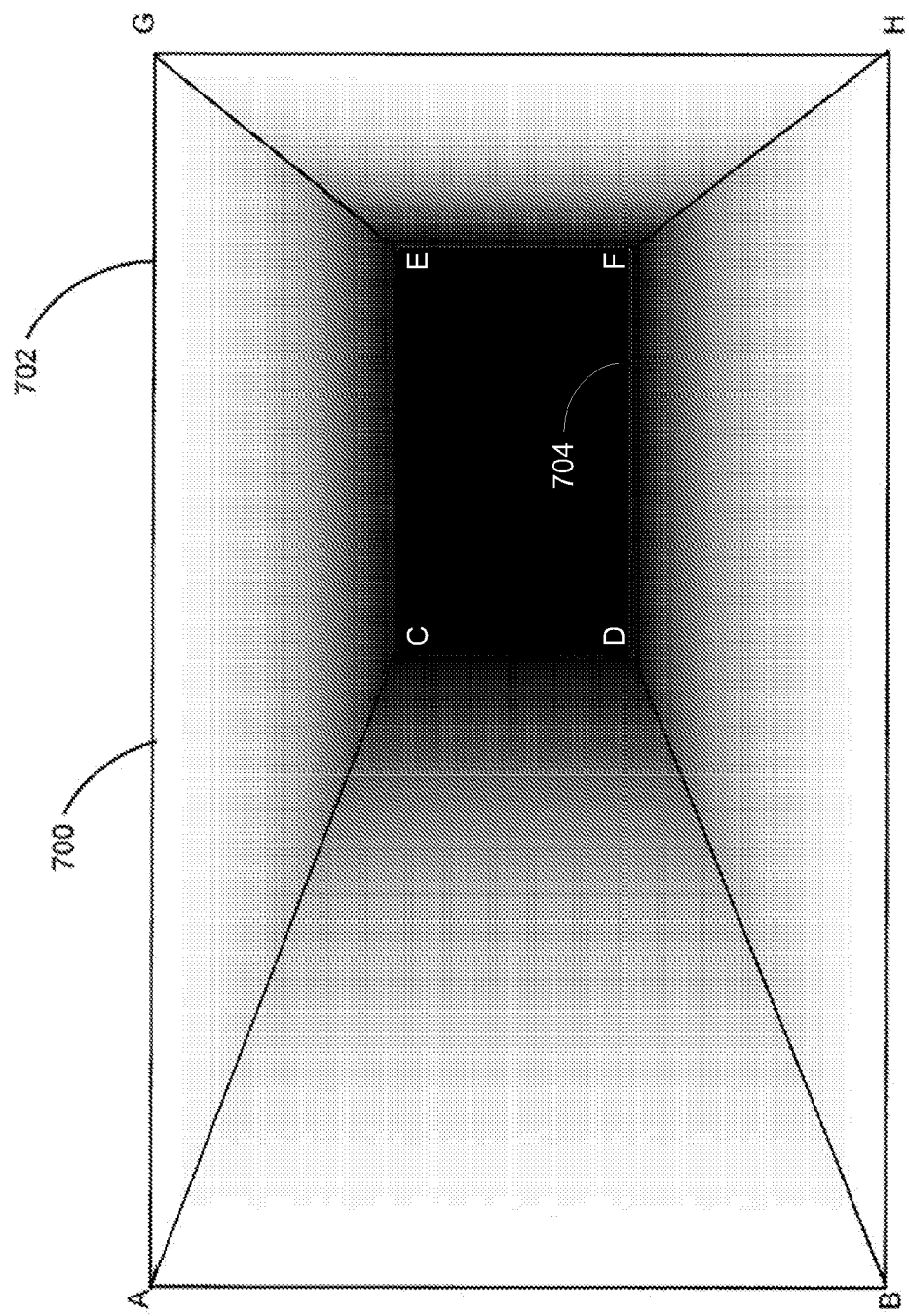
FIG. 7 is a diagram of a trapezoidal gradient model superimposed on a layer of a 2-D image to add depth to the 2-D image when rendered in stereoscopic 3-D.

Upon selection of the gray scale gradient model, an animator or artist adjusts the model in response to one or more indicators of a layer or object in operation 530. In one example, the trapezoidal gradient model 600 of FIG. 6 is applied to a portion of a layer rather than the entire layer. Thus, the user may shrink or otherwise adjust the size of the larger rectangle 602 and smaller rectangle 604 that define the gray scale template such that the gradient model approximates the shape of a particular portion of the layer, such as a hallway located off to one side of the layer. Such a gradient model 600 provides a tunnel stereoscopic 3-D effect to the hallway portion of the frame, without altering the rest of the layer. Another example is shown in FIG. 7. FIG. 7 a diagram of a trapezoidal gradient model for a layer of a 2-D frame to add depth and volume to the 2-D frame when rendered as a stereoscopic 3-D frame. As shown in FIG. 7 and in comparison with the gradient model of FIG. 6, the corners of the trapezoidal gradient model 600 have been moved or altered to adjust the gradient model for the objects of a layer. In particular, points A and B of the larger rectangle 702 has been moved horizontally to the right to stretch the larger rectangle. Further, the entire smaller rectangle 704 has been shifted horizontally to the right. However, it should be appreciated that the aspects of the gradient model 700 may be adjusted in any manner, including adjusting the angles of the lines that define the model. Generally, any aspect of the shape of a gradient model 700 may be manipulated to map more closely to an object or set of objects of a layer. Thus, the outer and inner boundaries of the gradient model 600 may be adjusted into any four sided shape, not just rectangles to define the boundaries of the gray scale template.

In addition, the various aspects of the gradient models may be animated to mirror or approximate the movement of an object of a scene of an animated or live-action film. For example, a scene may include several frames that, when displayed in sequence, shows an animated ball bouncing into the background of the scene. As described herein, a radial gradient model 910 is utilized to provide the ball object with a stereoscopic volume. In some embodiments, the radial gradient model is applied to each frame of the scene individually. In alternate embodiments, however, a first key frame is identified as a starting point for the animated gradient model, such as a frame when the bouncing ball object is at the lowest point. A second key frame is also identified, such as a frame when the ball object is at the highest point. To provide for the animated gradient model, a radial gradient model is applied to the ball object in the first key frame to provide a starting set point for the gradient model and another radial gradient model is applied to the ball object in the second key frame to provide an ending set point. A computer system then determines the movement of the radial gradient model from the starting set point to the ending set point, such that the radial gradient model appears to animate with the same movement as the ball object. The movement of the gradient model is determined through a interpolation or in-betweening process. Through this technique, a gradient model is utilized to provide the gradient models for an entire scene for an object, thereby reducing the amount of time needed to provide stereoscopic effects to the scene.

Any aspects of the gradient models may be animated in this manner. In one example, the shape of the gradient model is altered to mirror or approximate an object of a scene that also has a changing shape. This is achieved by providing a plurality of set points of the object that define the change in shape of the object. Further, the gray scale associated with any gradient model may also be animated. In one example, an object moves between the foreground and background of the stereoscopic frame during a scene of a film. Thus, in a similar manner as described, the gray scale of a gradient model is also animated by providing a plurality of set points that define the movement of the object through the perceptual z-axis of the stereoscopic scene.

Figure 8:
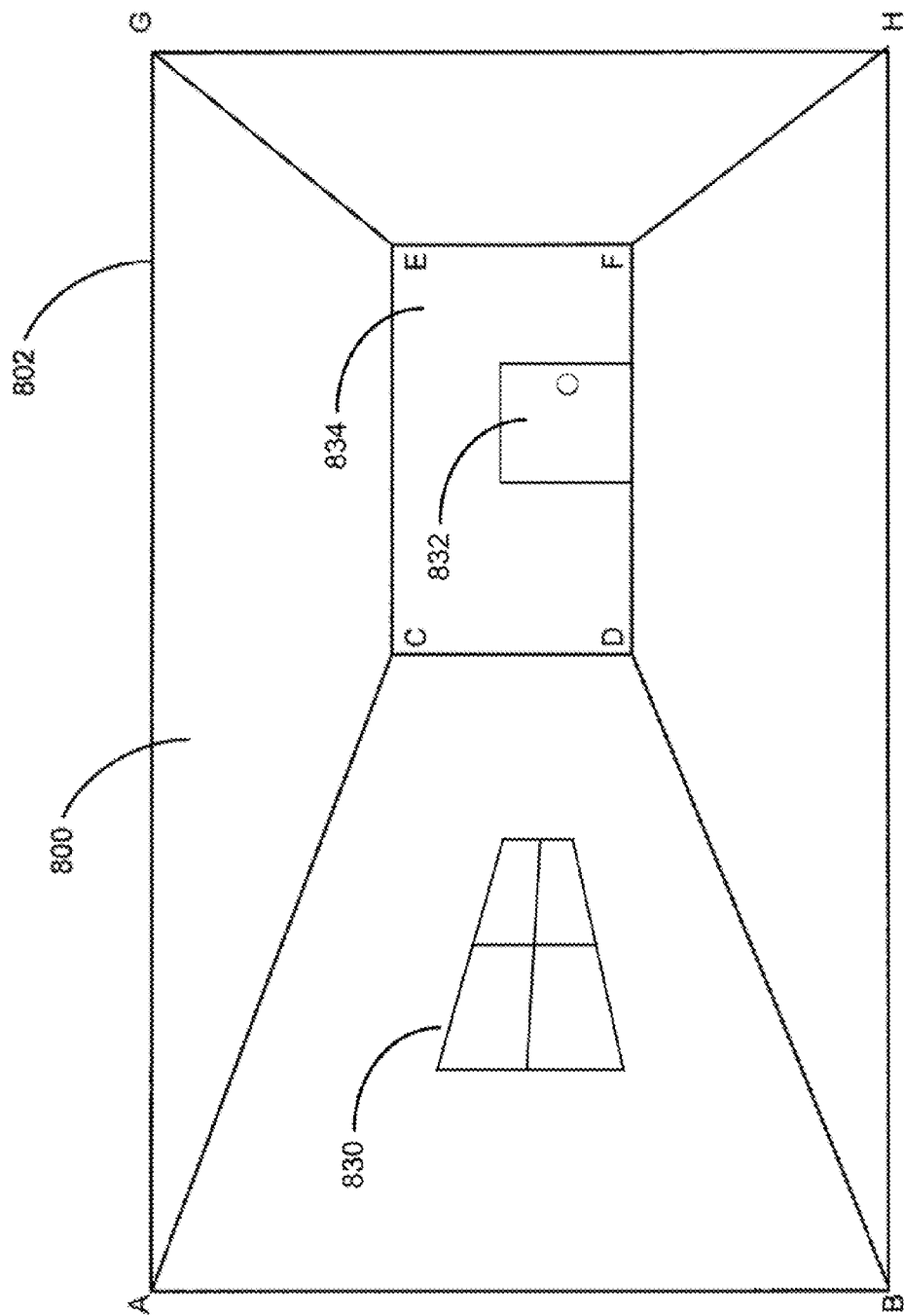
FIG. 8 is a diagram illustrating features of a layer for which the altered gradient model of FIG. 7 may provide a template.

FIG. 8 is a diagram illustrating features of a layer for which the altered gradient model of FIG. 7 may provide a template. The layer 800 includes several features of a 2-D frame that correspond to the altered gradient model. For example, the layer 800 includes a room scene, with a window 830 and a door 832. Further, the shape of the room has the shape similar to the gradient model of FIG. 7. Namely, the far wall 834 of the room has similar dimensions as the smaller rectangle 704 of the gradient model, with the other walls of the room having similar dimensions to the gray scale template of the gradient model 700.

Further, the gradient model 700 provides a gray scale template, or other stereoscopic depth attributes, that when applied to the layer as described herein, provides the room layer 800 with the appearance, when viewed with the appropriate stereo viewing glasses or otherwise, of extending into the background of a stereoscopic 3-D frame. In one example, the side walls of the room layer 800 appear to extend into the background. Such an effect may be achieved through the utilization of the altered gradient model 700 of FIG. 7. Generally, as described herein, the gray scale portion of the gradient model 700 provides a template from which a pixel offset for the pixels of the layer 800 may be determined. In this particular example, the far wall 834 of the room layer is provided with a depth pixel offset that places the far wall in the background of the stereoscopic scene. Thus, to provide the tunnel stereoscopic effect to the room layer, the dark colored pixels of the gradient model 700 corresponds to pixels of the layer 800 that have little to no pixel offset based on the gradient model while the lighter colored pixels of the gradient model correspond to pixels of the layer that have a large pixel offset, effectively locating those pixels in foreground of the 3-D frame. Stated differently, through perceptual z-axis depth pixel offsetting, the far wall is first positioned in the back of the frame and then the gradient tool is used to perceptually pull the side walls forward from the far wall. Thus, through application of the gradient model 700 to the various pixel offsets of the layer 800, the layer may achieve a desired tunnel effect that provides the layer with perceived stereoscopic depth and volume.

The manipulation of the aspects of the gradient model may be performed in a variety of ways. In one embodiment, an artist or animator manually adjusts the gradient model through a mouse-type device or other input device to a computer system, such as by pointing and clicking, and then manipulating the gradient shape (e.g., dragging corner joint C from the position shown in FIG. 6 to FIG. 7). In another embodiment, the artist adjusts the aspects of the gradient model by providing coordinates, such as [x,y] positions for the one or more points of the gradient model. In still another embodiment, the shape of the gradient model is adjusted automatically by the computer system in response to several aspects of the 2-D frame. Through manipulation of the shape, the gradient model may better represent the desired stereoscopic 3-D effect for the layer. Such effects may be based on the content of the layer, such as the number and shape of the objects of the layer and certain coloring effects, such as lighting and shading.

To further adjust the shape of the gradient models, one or more cues as to the proper depth of the various features of an object is obtained from the 2-D frame. For example, the 2-D frame from which the object is extracted may be an animated frame including several ink lines that define several features of the object, such as ink lines that define a character's facial features, clothing and/or appendages. Such ink lines may be considered when applying a gradient model to the layer. For example, the ink lines of a 2-D frame may provide a sense of depth by making objects in the foreground of the frame larger than similar objects in the background of the frame. Such a perception may be indicated in a character's arm by making the hand larger than the rest of the arm, thereby indicating that the hand is located further the foreground of the stereoscopic 3-D frame than the rest of the character. Thus, by analyzing the ink lines of the character or object, separate portions of the object may be given an adjusted pixel offset value that is more or less than the pixel offset of the rest of the object to provide a more detailed stereoscopic 3-D effect to the object. Several techniques may be utilized to identify and isolate portions of the object to perform gradient modeling. Several such techniques are described in more detail in U.S. patent application Ser. No. 12/571,418, entitled "APPARATUS AND METHOD FOR REMOVING INK LINES AND SEGMENTATION OF COLOR REGIONS OF A 2-D IMAGE FOR CONVERTING 2-D IMAGES INTO STEREOSCOPIC 3-D IMAGES" by Tara Handy Turner et. al., the contents of which are incorporated in their entirety by reference herein.

Returning to FIG. 5, once the gradient model is created and altered as desired by the computer system or animator to resemble the layout of a layer or object, the computer system may determine a pixel offset for the object in operation 540 based on the gray scale template of the gradient model. The pixel offset determined in operation 540 may be a combination of the depth pixel offset applied to the layer from which the object is obtained and an adjusted pixel offset based on a gradient model gray scale template corresponding to the layer. Generally, each pixel defining the object has an initial depth pixel offset that relates to the overall perceived depth of the object in the stereoscopic 3-D frame. Thus, the pixel offset determined in operation 540 may be in addition to the depth pixel offset already associated with a pixel of the object or layer. In alternate embodiments, a volume pixel offset based on a gradient model may be associated with a particular pixel before the depth pixel offset is determined. Irrespective of the order in which the depth pixel offset and gradient model pixel offset are determined, the total pixel offset for any particular pixel of the 2-D frame may include both pixel offsets.

Figure 9A:
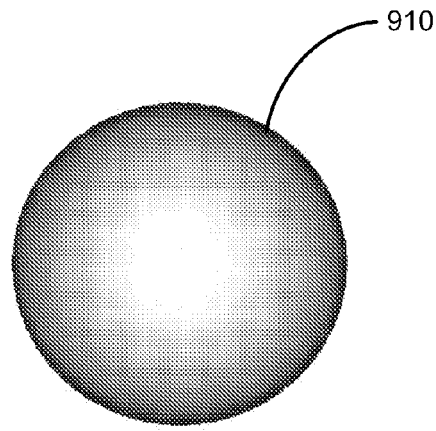
FIG. 9A is a diagram illustrating one example of a gray scale gradient model for a generally circular object of a 2-D frame.
Figure 9B:
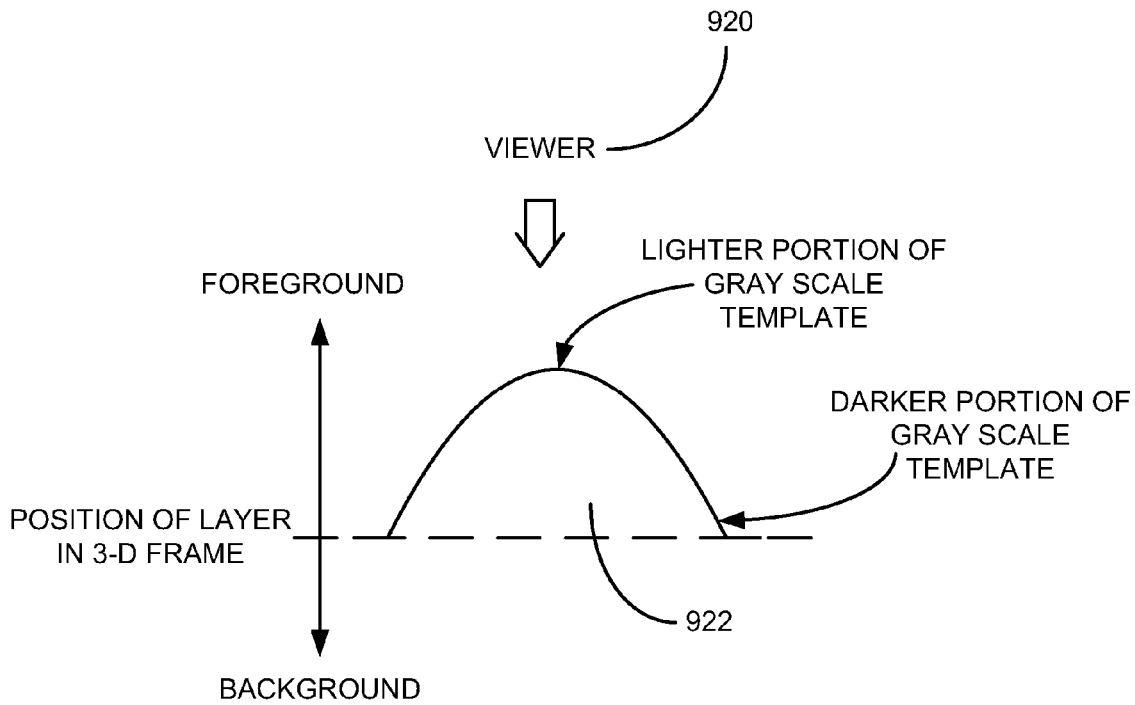
FIG. 9B is a diagram illustrating the volume effect of an object of a 2-D frame in relation to the gray scale gradient model.

The gradient model gray scale may be utilized to specify a pixel offset for one or more pixels of the layer that determines the depth that each pixel of the layer may appear in the stereoscopic 3-D frame. For example, FIGS. 9A and 9B are diagrams illustrating the volume effect of a generally round object of a 2-D frame in relation to a gray scale gradient model. FIG. 9B is a top view of the perceived volume of the round object of the 2-D layer corresponding to the gray scale gradient model set out in FIG. 9A. Thus, to a viewer 920 of the stereoscopic 3-D frame, the object appears to extend into the foreground of the 3-D frame. As should be appreciated, the diagram of 9B is merely an illustration of the stereoscopic volume of an object. The object does not physically extend into the foreground of frame, but only appears as such when the left eye and right eye layers of the 3-D frame are viewed by the viewer.

As shown, the object 922, after application of the gradient model gray scale, appears to the viewer 920 to have a stereoscopic 3-D volume that is based on the gradient model 910 provided in FIG. 9A. In this example, the whiter portions of the gradient model 910 correspond to the center of the object while the darker portions of the gradient model map to the edges of the round object. Further, based on the shades of the gradient model 910, the pixels of the object that correspond to the whiter portions of the gradient model may have a greater pixel offset than that of the pixels of the object that correspond to the darker portions of the gradient model, with each shade of gray between the white and dark portions receiving a sliding scale of pixel offsets. Thus, a pixel offset for each pixel of the round object may be determined based on the shades of gray contained within the gradient model 910. Further, the larger the pixel offset the further into the foreground or background the pixel may be perceived in the 3-D frame. Thus, when the object 922 is rendered in stereoscopic 3-D, the center of the object (with larger pixel offsets) may appear further in the foreground of the stereoscopic 3-D frame when compared to the edges of the object (with smaller pixel offsets). In this manner, each pixel of the object may correspond to a shade of gray in the gradient model and have an associated pixel offset that is based on the shade of gray for that particular pixel to provide the object with the appearance of stereoscopic volume or depth.

It should be appreciated that the pixel offset applied to the object may be based on the gradient model in any manner. For example, the darker portions of the gradient model 910 may provide a larger pixel offset than the whiter portions, or only those pixels colored with a specific shade of gray from the gradient model may have a pixel offset. Further, the pixel offset applied to a pixel of the object may place the pixel either in the foreground or in the background in relation to the other pixels of the object. In other words, the pixel offset for any particular shade of gray of the gradient model may have a value as well as a direction (foreground or background). For example, a grayscale value of 50% gray may indicate no pixel offset at the corresponding pixel location while a value of black places the pixel in the background and a value of white may place the pixel in the foreground with respect to the rest of the object. In general and used herein, however, those portions of the object with larger pixel offset may be perceived further from the rest of the object and closer to the viewer when viewed in stereoscopic 3-D. Those portions with smaller pixel offsets may have little to no stereoscopic 3-D effect applied. Further, each shade of gray within the gradient model may have an associated volume pixel offset. Therefore, the object may have several pixel offsets associated with the pixels of the object corresponding to the many shades of gray within the gradient model. Further, the more shades of gray utilized to acquire the pixel offset map, the more detailed the stereoscopic volume technique may appear when rendered in stereoscopic 3-D.

Returning to FIG. 5, once the gradient model pixel offset and depth pixel offset are determined, the computer system creates a left eye layer and a right eye layer for the object in operation 550. The creation of the paired frames may be similar to operation 160 of FIG. 1. Thus, the left eye layer and the right eye layer has similar content to the extracted 2-D layer, including the objects of the layer, such that the color of each pixel of the created layers remain the same as that of the original 2-D layer. Once created, the computer system may shift the pixels of the left eye and right eye layers by the determined pixel offset in operation 560. As mentioned, the pixel shift for any particular pixel of the object may include both the gradient model pixel offset and the depth pixel offset to provide a volume to the object as well as place the object within the z-axis of the stereoscopic 3-D frame as well as provide a volume to the object. The shift of one or more pixels of an object of a 2-D layer in response to a gray scale template, such as a gradient model, is described in more detail in related patent application Ser. No. 12/571,406.

The operations of the method of FIG. 5 may be performed for any number of gradient models. Several examples of gradient models are illustrated in FIGS. 10-13. FIG. 10 is a diagram of a cube point gradient model 1000 for adding depth and volume to a 2-D image when rendered in stereoscopic 3-D. The cube point gradient model 1000 is a three dimensional cube object with a gray scale bounded by the edges of the cube object. In this embodiment of the cube point gradient model 1000, the center of the cube is whiter in color than the edges of the cube. Between the white center of the cube and the darker outer edges, the gray scale coloring transitions from the white color to the dark color uniformly as the color moves away from the center. This gradient model 1000, as with all gradient models described herein, may be used in the method described in FIG. 5 to adjust the pixel offset of one or more pixels of a layer of a 2-D image. Further, it should be appreciated that the gray scale template may be applied in any manner within the cube point gradient model 1000. For example, the center of the cube may be darker than the edges.

FIG. 11 is a diagram illustrating a quadrangle gradient model example for adding depth and volume to a 2-D image when rendered in stereoscopic 3-D. The quadrangle gradient model 1100 is a three dimensional plane object defined by points A, B, C and D. Further, the quadrangle gradient model 1100 includes a gray scale template bounded by the edges of the plane object. In this embodiment of the quadrangle gradient model 1100, the left side of the plane is whiter in color than the right side of the plane. Between the left side and the right side of the plane, the gray scale template transitions from a white color to a dark color uniformly as the color moves across the plane. In another embodiment, the gray scale template may be darker on the right side and become lighter in color near the right edge of the plane.

FIG. 12 is a diagram illustrating a radial gradient model example for adding depth and/or volume to a 2-D image when rendered in stereoscopic 3-D. The radial gradient model 1200 is a spherical object including a gray scale template bounded by the edges of the sphere object. In this embodiment of the radial gradient model 1200, the center of the sphere is whiter in color than the edges of the sphere. Between the white center and the darker outer edges, the gray scale template transitions from the white color to the dark color uniformly as the color moves away from the center. In an alternate embodiment, the center of the sphere may be darker than the edges.

FIG. 13 is a diagram of a plurality of jointed gradient models for adding depth and/or volume to a 2-D image when rendered in stereoscopic 3-D. The first type 1310 of jointed gradient model illustrated includes a single segment with no associated joint. The first example 1310 of the jointed gradient model takes the general form of a circle 1314 defining the end of the gradient model with a rectangular shape 1312 extending away from the circle shape. It is not a requirement that the ends of the gradient model (1312, 1314) be a circle and rectangle, respectively. Further, a gray scale template is included within the gradient model bounded by the circle 1314 and rectangle 1312 shapes. In the embodiment shown, the circle 1314 of the jointed gradient model is white in color, with the gray scale template transitioning into a dark color as the gray scale template extends away from the circle shape. However, it should be appreciated that the jointed gradient model 1310 may include a gray scale template that takes any coloring scheme.

Several aspects of the first example 1310 of the jointed gradient model may be adjusted to match one or more objects of a 2-D frame. For example, the radius of the circle shape 1314 of the depth gradient 1310 may be adjusted to match an aspect of an object. In the embodiment shown, the width of the rectangle portion 1312 of the jointed gradient model 1310 is the same as the diameter of the circle 1314 portion. However, as the diameter of the circle 1314 is increased or decreased as desired, the width of the rectangle 1312 may or may not vary in response. In an alternate embodiment, the rectangle 1312 takes the form of a quadrangle shape in response to the modification to the radius of the circle 1314, with a first width of the quadrangle matching the diameter of the circle where the two shapes meet and a second width different than the first width at the opposite end of the quadrangle. Generally, any aspect of the shape of the jointed gradient model 1310 may be adjusted to fit the objects of the 2-D frame.

The manipulation of the aspects of the depth model may be performed in a variety of ways. In one embodiment, an artist manually adjusts the depth model through a mouse or other input device to a computer system, such as by pointing and clicking. In another embodiment, the artist adjusts the aspects of the depth model by providing coordinates, such as [x,y]

positions for the one or more points of the depth model. In still another embodiment, the shape of the depth model is adjusted automatically by the computer system in response to several aspects of the 2-D frame. As described, the values may vary over time in response to the movement and deformation of the object or layer to which the gradient model is applied.

A second example 1320 is also illustrated that includes a single joint. The single joint embodiment 1320 includes a first segment 1322, a second segment 1324, a first joint 1326 that connects the first segment and the second segment and a circle shape 1328 defining the end of the gradient model. In addition, each of the separate portions of the single joint gradient model 1320 is adjustable. Further, as shown, a gray scale template is included in the gradient model 1320 such that the circle shape 1328 is white in color, with the gray scale template transitioning into a dark color as the gray scale extends away from the circle shape, with the darkest part of the gradient model at the first segment 1322. Again, the gray scale for this embodiment may take any coloring scheme as desired. For example, the circle shape 1328 may be white in color, while the joint shape 1326 may be 75% gray in color and the rectangular end point may be 10% gray in color. The colors in the segments between these two points would transitions along the grayscale in any fashion, such as linearly or exponentially, to the values at the joint or end points.

A third example 1330 is also illustrated that includes two joints. The two joint embodiment 1330 includes a first segment 1332, a second segment 1334 and a third segment 1336. Each of these segments may be connected to another segment through a first joint 1338 or a second joint 1340. Further, the first segment 1332 and the third segment 1336 includes circle shapes 1342, 1344 that define the end of the segments opposite the first and second joints. As with the above examples, the aspects of this embodiment are also adjustable, including the width of each segment, the radius of each joint and the radius of each circle shape.

A gray scale template is also included bounded by the portions of the two joint gradient model 1330. In addition, each of the separate portions of the single joint gradient model 1320 is adjustable. In the embodiment shown, the circle shapes 1342, 1344 are white in color, with the gray scale template transitioning into a dark color as the gray scale template extends away from the circle shapes, with the darkest part of the gradient model along the second segment 1334. Again, the gray scale template for this embodiment may take any coloring scheme as desired.

The embodiments shown in FIG. 13 are just some examples of the types of jointed gradient models that may be created to create a gray scale template from which a pixel offset may be determined for an object of a 2-D frame. It should be appreciated that any number of joints may be used to create the gradient model. Further, the gray scales shown transition uniformly across the shape. However, the gray scale templates may be adjusted or created as desired to achieve a proper stereoscopic 3-D effect for an object. Generally, the jointed gradient models may be utilized to provide a stereoscopic 3-D effect to an object such that the object extends away from the screen or behind the screen from which the stereoscopic 3-D frame is being displayed.

Figure 14:
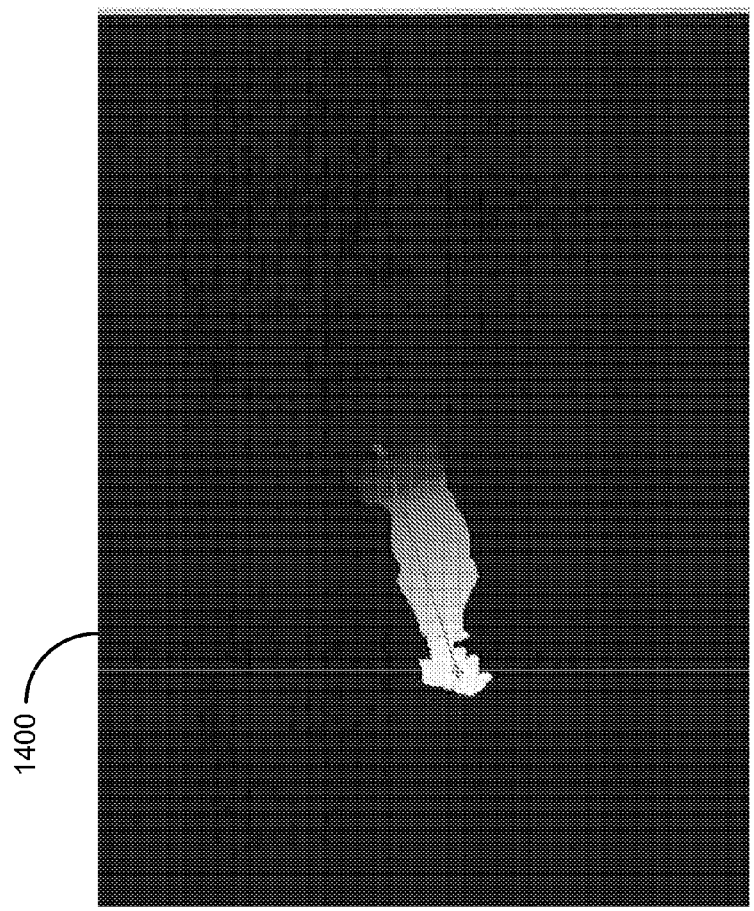
FIG. 14 is a diagram of a jointed gradient model superimposed on a layer of a 2-D image to add depth to the 2-D image when rendered in stereoscopic 3-D.

FIG. 14 is a diagram of a jointed gradient model superimposed on an object of a 2-D frame such that a gray scale template is created that provides several pixel offsets such that the object appears to extend forward from the screen when the layer is rendered in stereoscopic 3-D. The gradient model of FIG. 14 is created by utilizing the first example 1310 of the jointed gradient model shown in FIG. 13.

As shown, the gradient models discussed herein corresponds to an object or layer of a 2-D frame such that the pixels of the gradient model 1400 correspond to one or more pixels of the layer. In this example, the layer includes a character's arm as an object. Thus, the gradient model 1400 comprises pixels that correspond to the object in a one to one fashion. Further, the gradient model 1400 includes a gray scale template with various shades of gray representing a pixel offset to be applied to the object or layer. In particular, the gradient model 1400 provides a gray scale template for the character's arm object such that the character's hand is whiter in color than the rest of the character's arm, with the portion of the arm that attaches to the rest of the character is black or near black.

In this example, the whiter portions of the gray scaled template provide a greater pixel offset to the corresponding pixels of the object than the darker portions. When rendered in stereoscopic 3-D, those portions with a greater pixel offset appear to extend further from the rest of the layer. In one embodiment, the character's arm extends into the foreground while, in another embodiment, the character's arm appears to extend into the background of the stereoscopic 3-D frame. Such a gradient model may be useful in situations where the character is pointing either into the foreground or background. Thus, rather than having the character appear flat, the character's arm appears to actually extend away from the character's body. By creating a gray scale gradient model and adjusting the pixel offset of the pixels of the layer based on the gradient model, a more detailed stereoscopic 3-D effect may be achieved for one or more objects of a 2-D frame.

Figure 15:
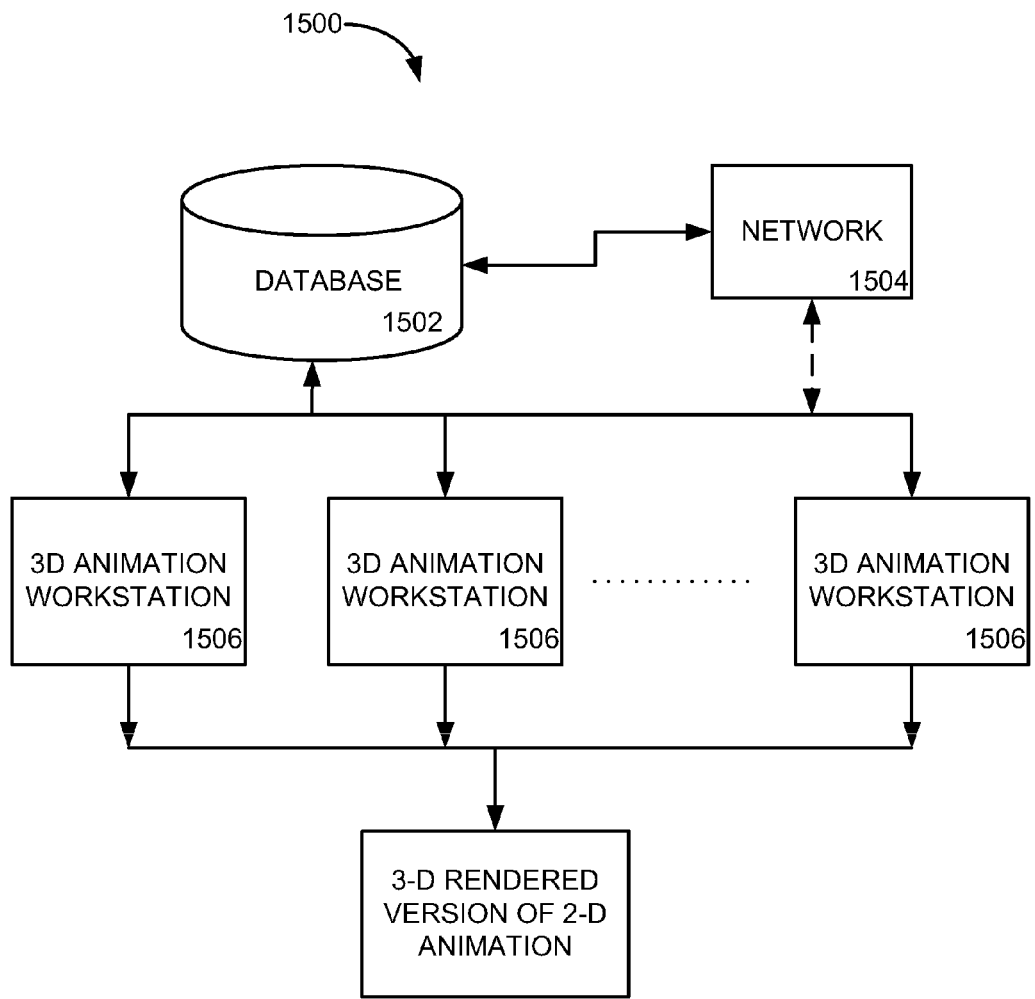
FIG. 15 is a high-level block diagram illustrating a particular system for converting a 2-D image of a multimedia presentation to a stereoscopic 3-D image.

FIG. 15 is a high-level block diagram illustrating a particular system 1500 for converting a 2-D image of a multimedia presentation to a stereoscopic 3-D image. The system described below may perform one or more of the operations described above with reference to FIGS. 1 and 5.

The system 1500 includes a database 1502 to store one or more scanned or digitally created layers for each image of the multimedia presentation. In one embodiment, the database 1502 may be sufficiently large to store the many layers of an animated feature film. Generally, however, the database 1502 may be any machine readable medium. A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory. Common forms of machine-readable medium may include, but are not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. Alternatively, the layers of the 2-D images may be stored on a network 1504 that is accessible by the database 1502 through a network connection. The network 1504 may comprise one or more servers, routers and databases, among other components to store the image layers and provide access to such layers. Other embodiments may remove the database from the system 1500 and extract the various layers from the 2-D image directly by utilizing the one or more computing systems.

The system 1500 also include one or more computing systems 1506 to perform the various operations to convert the 2-D images of the multimedia presentation to stereoscopic 3-D images. Such computing systems 1506 may include workstations, personal computers, or any type of computing device, including a combination therein. Such computer systems 1506 include several computing components, including but not limited to, one or more processors, memory components, I/O interfaces, network connections and display devices. Memory and machine-readable mediums of the computing systems 1506 may be used for storing information and instructions to be executed by the processors. Memory also may be used for storing temporary variables or other intermediate information during execution of instructions by the processors of the computing systems 1506. In addition, the computing systems 1506 may be associated with the database 1502 to access the stored image layers. In an alternate embodiment, the computing systems 1506 may also be connected to the network through a network connection to access the stored layers. The system set forth in FIG. 15 is but one possible example of a computer system that may employ or be configured in accordance with aspects of the present disclosure.

It should be noted that the flowcharts of FIGS. 1 and 5 are illustrative only. Alternative embodiments of the present invention may add operations, omit operations, or change the order of operations without affecting the spirit and scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for generating a stereoscopic image from a two-dimensional image comprising:
   obtaining from a storage medium a first two-dimensional digital image comprising a first plurality of pixel values corresponding to a first object having a first shape;
   obtaining from the storage medium a first gradient model comprising a first plurality of depth attributes, wherein a processing element selects the first gradient model based on the first shape from a group stored on the storage medium comprising: a radial gradient model, a trapezoidal gradient model, a rectangular gradient model and a cube gradient model;
   obtaining from the storage medium a second two-dimensional digital image comprising a second plurality of pixel values corresponding to the first plurality of pixel values; and
   applying the first gradient model to the second plurality of pixel values by the processing element to horizontally offset one or more of the second plurality of pixel values relative to the first plurality of pixel values based upon the depth attributes of the first gradient model to create the stereoscopic image from the first two-dimensional digital image.

2. The method of claim 1 wherein the first plurality of depth attributes comprises a gray scale depth mapping including a plurality of gray scale values corresponding to the second plurality of pixel values, and wherein the operation of applying the first gradient model comprises horizontally displacing the second plurality of pixel values as a function of the gray scale values corresponding to the second plurality of pixel values.

3. The method of claim 2 wherein a darker gray scale value of the gray scale values correspond to less horizontal displacement of the second plurality of pixel values and a lighter gray scale value of the gray scale values correspond to more horizontal displacement of the second plurality of pixel values.

4. The method of claim 1 wherein the horizontally displacing further comprises:
   shifting one or more of the second plurality of pixel values along an x-axis.

5. The method of claim 1 further comprising horizontally displacing one or more of the first plurality of pixel values based upon the gray scale template value for the first plurality of pixel values.

6. The method of claim 1 wherein the first two-dimensional digital image and the second two-dimensional digital image are displayed substantially contemporaneously for stereoscopic viewing of the image.

7. The method of claim 1 further comprising:
   altering a first attribute of the first gradient model to adjust the shape of the first gradient model to approximate the first shape of the first object.

8. The method of claim 7 wherein the first two-dimensional digital image comprises one of a plurality of two-dimensional frames comprising a scene of a multimedia presentation; and wherein the altering operation comprises animating the first attribute of the gradient model to approximate the animation of an animated first object of the scene of the multimedia presentation.

9. The method of claim 1 further comprising:
   obtaining a second gradient model, the second gradient model comprising a second plurality of depth attributes; and
   wherein the applying operation further comprises applying the second gradient model to the second plurality of pixel values to horizontally displace one or more of the second plurality of pixel values based upon the depth attributes of the second gradient model.

10. The method of claim 1 wherein the first gradient model is a jointed gradient model and the first plurality of pixel values represent a jointed first object of the first two-dimensional digital image.

11. The method of claim 10, wherein the jointed gradient model is a combination of at least two gradient models selected from the group of gradient models.

12. The method of claim 1, wherein a shape of the first gradient model substantially matches the shape of the first object.

13. The method of claim 1, wherein the first object has an irregular shape.

14. A method for generating a stereoscopic frame comprising:
   extracting a layer from a two-dimensional frame by a processing element, the layer comprising a first portion and a second portion of the two-dimensional frame, wherein the first portion corresponds to a first object;
   obtaining from a storage medium a gradient model comprising a gray scale template having a plurality of gray scale values relative to each of the first portion and second portion, wherein the gradient model takes the form of a geometric shape corresponding to the first object, the gradient model selected by the processing element from a plurality of gradient models on the storage medium;

altering by the processing element the shape of the gradient model to approximate a portion of the two-dimensional frame;

generating a duplicate layer comprising a duplicate of the first image portion and a duplicate of the second image portion; and horizontally offsetting the first image portion relative to the duplicate of the first image portion a first amount based on a portion of the plurality of gray scale values and the second image portion relative to the duplicate of the second image a second amount, different from the first amount, based on a portion of the plurality of gray scale values;

wherein the layer and the duplicate layer are displayed substantially contemporaneously for stereoscopic viewing of the image.

15. The method of claim 14 wherein the altering operation adjusts the shape of the gradient model to correspond to the first object.

16. The method of claim 14 wherein the first amount is based on a first pixel color of a first set of pixels of the gray scale object and the second amount is based on a second pixel color of a second set of pixels of the gray scale object, the first pixel color different from the second pixel color.

17. The method of claim 14 further comprising:
determining a depth pixel offset for the layer, the depth pixel offset corresponding to a perceived depth for the layer in a stereoscopic frame; and
horizontally offsetting the layer in response to the depth pixel offset.

18. The method of claim 14 wherein the first gradient model is a jointed gradient model comprising:
a first segment;
a second segment; and
a joint connecting the first segment and the second segment, wherein the first segment and the second segment extend from the joint obliquely.

19. The method of claim 14 wherein the two-dimensional frame is one of a plurality of two-dimensional frames comprising a scene of a multimedia presentation, the method further comprising:

animating the one or more attributes of the gradient model based on an animated first object of the scene of the multimedia presentation.

20. The method of claim 14 wherein the operation of generating a copy of the image comprises:
generating a mesh of the second image portion, the mesh comprising x and y values;
applying the gradient model to the second image portion wherein the gray scale values of the gray scale template correspond to a plurality of z-dimension values; and
warping the mesh in a z-dimension as a function of the z-dimension values of the gradient model.

21. A system for generating stereoscopic images from a two-dimensional planar image, the system comprising:
one or more computing devices coupled with a storage medium storing one or more two-dimensional frames;
the storage medium further including a plurality of digital geometric depth models, each geometric depth model including stereoscopic depth attributes;
wherein the one or more computing devices are configured to perform the operations of:
retrieving a first two-dimensional digital image comprising a first plurality of pixel values corresponding to a first object;
obtaining a first depth model from the plurality of digital geometric depth models, the first depth model comprising a plurality of stereoscopic depth attributes relative to each of the first plurality of pixel values, wherein the first depth model is selected by a processing element based on the shape of the first object;
obtaining a second two-dimensional digital image comprising a second plurality of pixel values corresponding to the first plurality of pixel values; and
horizontally displacing one or more of the second plurality of pixel values based upon the plurality of stereoscopic depth attributes.

22. The system of claim 21 further comprising:
a network configured to store the first two-dimensional frame, wherein the database is further configured to retrieve the first two-dimensional frame from the network.

* * * * *